(12) United States Patent
Langvin et al.

(10) Patent No.: US 9,788,611 B2
(45) Date of Patent: Oct. 17, 2017

(54) METHOD OF USING AN INFLATABLE MEMBER TO CUSTOMIZE AN ARTICLE

(71) Applicant: NIKE, Inc., Beaverton, OR (US)

(72) Inventors: Elizabeth Langvin, Sherwood, OR (US); Zvi Rapaport, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 77 days.

(21) Appl. No.: 15/008,605

(22) Filed: Jan. 28, 2016

(65) Prior Publication Data

US 2016/0135546 A1   May 19, 2016

Related U.S. Application Data

(60) Division of application No. 14/032,433, filed on Sep. 20, 2013, now Pat. No. 9,277,786, which is a division
(Continued)

(51) Int. Cl.
*A43D 3/00* (2006.01)
*B32B 37/00* (2006.01)
(Continued)

(52) U.S. Cl.
CPC .............. *A43D 3/04* (2013.01); *A43B 3/0078* (2013.01); *A43B 3/0084* (2013.01); *A43D 3/02* (2013.01);
(Continued)

(58) Field of Classification Search
CPC . A43D 3/00; A43D 3/04; A43D 3/007; A43D 3/0078; A43D 3/008; A43D 3/0084; A43D 3/02; A43D 3/025; A43D 3/08; A43D 3/14; A43D 3/1408; A43D 3/1441; A43D 3/145; A43D 95/14; A43D 95/00;
(Continued)

(56) References Cited

U.S. PATENT DOCUMENTS 565,341 A   8/1896   Fletcher
657,814 A   9/1900   Crozier
(Continued)

FOREIGN PATENT DOCUMENTS

CN   86204529 U   5/1987
CN   1090481 A   8/1994
(Continued)

OTHER PUBLICATIONS

International Preliminary Report on Patentability (including Written Opinion of the ISA) for Application No. PCT/US2012/034734, mailed on Nov. 7, 2013.
(Continued)

*Primary Examiner* — Michael N Orlando
*Assistant Examiner* — Matthew Hoover
(74) *Attorney, Agent, or Firm* — Banner & Witcoff, Ltd.

(57) ABSTRACT

A method of using an inflatable member to customize an article is described. An inflatable member includes at least one adjustable portion. The inflatable member may be inserted into an article. The position of the adjustable portion can be changed according to the size of the article. The inflatable member can also be filled with fluid according to the size of the article. The inflatable member may be used to adjust the size of an article. The inflatable member may be used to apply a graphic to an article.

17 Claims, 22 Drawing Sheets

Related U.S. Application Data of application No. 13/093,238, filed on Apr. 25, 2011, now Pat. No. 8,578,534, which is a continuation-in-part of application No. 12/490,954, filed on Jun. 24, 2009, now Pat. No. 7,950,432.

(51) Int. Cl.

| | | |
|---|---|---|
| *B44C 1/00* | (2006.01) | |
| *A43D 3/04* | (2006.01) | |
| *A43D 3/14* | (2006.01) | |
| *A43B 3/00* | (2006.01) | |
| *A43D 3/02* | (2006.01) | |
| *A43D 3/08* | (2006.01) | |
| *A43D 95/14* | (2006.01) | |
| *B44C 1/17* | (2006.01) | |

(52) U.S. Cl.
CPC .............. *A43D 3/025* (2013.01); *A43D 3/08* (2013.01); *A43D 3/145* (2013.01); *A43D 3/1408* (2013.01); *A43D 3/1441* (2013.01); *A43D 95/14* (2013.01); *B32B 37/025* (2013.01); *B44C 1/17* (2013.01)

(58) Field of Classification Search
CPC ...... A43D 95/10; B32B 37/00; B32B 37/025; B44C 1/00; B44C 1/10; B44C 1/17
See application file for complete search history.

(56) References Cited

U.S. PATENT DOCUMENTS

| | | | |
|---|---|---|---|
| 673,063 A * | 4/1901 | Ruggles | A43D 3/04 12/114.4 |
| 795,217 A | 7/1905 | Gaunt | |
| 890,131 A | 6/1908 | Fischer | |
| 1,160,631 A | 11/1915 | Magnus | |
| 1,301,776 A | 4/1919 | Woods | |
| 1,499,758 A | 7/1924 | Babcock | |
| 1,691,054 A | 11/1928 | Galterio | |
| 1,753,857 A | 4/1930 | Galterio et al. | |
| 1,808,544 A | 6/1931 | Glidden et al. | |
| 1,893,795 A | 1/1933 | Chapman | |
| 1,970,600 A | 8/1934 | Frost | |
| 2,104,839 A | 1/1938 | Panos | |
| 2,107,140 A | 2/1938 | Cirelli | |
| 2,116,917 A | 5/1938 | Ventola | |
| 2,182,022 A | 12/1939 | Griswold | |
| 2,466,598 A | 4/1949 | Civita | |
| 2,511,366 A | 6/1950 | Muzinich | |
| 2,537,785 A | 1/1951 | Oppenheim | |
| 2,538,247 A | 1/1951 | Holt | |
| 2,574,940 A | 11/1951 | Strom | |
| 2,647,337 A | 8/1953 | Martin | |
| 2,651,119 A | 9/1953 | Harrington | |
| 2,651,857 A | 9/1953 | Griswold et al. | |
| 2,940,095 A | 6/1960 | Bingham, Jr. | |
| 3,362,091 A | 1/1968 | Drago | |
| 3,483,580 A | 12/1969 | Cherry | |
| 3,803,655 A | 4/1974 | White et al. | |
| 4,060,869 A | 12/1977 | Brown | |
| 4,069,531 A | 1/1978 | Streich | |
| 4,152,188 A | 5/1979 | Friedrich et al. | |
| 4,183,156 A | 1/1980 | Rudy | |
| 4,188,254 A | 2/1980 | Hemperly, Jr. | |
| 4,219,945 A | 9/1980 | Rudy et al. | |
| 4,247,355 A | 1/1981 | Friedrich et al. | |
| 4,266,312 A | 5/1981 | Hall | |
| 4,400,840 A | 8/1983 | Sly | |
| 4,505,975 A | 3/1985 | Majima | |
| 4,512,052 A | 4/1985 | Bruno | |
| 4,660,242 A | 4/1987 | Vornberger et al. | |
| 4,670,084 A | 6/1987 | Durand | |
| 4,724,026 A | 2/1988 | Nelson | |
| 4,792,376 A | 12/1988 | Denley | |
| 4,888,713 A | 12/1989 | Falk et al. | |
| 4,899,411 A | 2/1990 | Johnson et al. | |
| 4,936,029 A | 6/1990 | Rudy | |
| 4,964,229 A | 10/1990 | Laberge | |
| 5,042,176 A | 8/1991 | Rudy | |
| 5,087,495 A | 2/1992 | Nelson | |
| 5,097,390 A | 3/1992 | Gerrie et al. | |
| 5,255,352 A | 10/1993 | Falk | |
| 5,296,182 A | 3/1994 | Thary | |
| 5,341,532 A | 8/1994 | Markowitz | |
| 5,414,975 A | 5/1995 | Hummel | |
| 5,477,577 A | 12/1995 | Hadley | |
| 5,486,397 A | 1/1996 | Gordon et al. | |
| 5,713,141 A | 2/1998 | Mitchell et al. | |
| 5,875,504 A * | 3/1999 | Tambling | A43D 3/1483 12/114.2 |
| 5,885,500 A | 3/1999 | Tawney et al. | |
| 5,893,964 A | 4/1999 | Claveau | |
| 5,952,065 A | 9/1999 | Mitchell et al. | |
| 5,985,416 A | 11/1999 | Sherman et al. | |
| 5,994,264 A | 11/1999 | Sherman et al. | |
| 6,013,340 A | 1/2000 | Bonk et al. | |
| 6,082,025 A | 7/2000 | Bonk et al. | |
| 6,127,026 A | 10/2000 | Bonk et al. | |
| 6,203,868 B1 | 3/2001 | Bonk et al. | |
| 6,295,679 B1 | 10/2001 | Chenevert | |
| 6,299,817 B1 | 10/2001 | Parkinson | |
| 6,321,465 B1 | 11/2001 | Bonk et al. | |
| 6,485,668 B1 | 11/2002 | Murphy et al. | |
| 6,544,634 B1 | 4/2003 | Abrams et al. | |
| 6,670,029 B2 | 12/2003 | Norton et al. | |
| 6,718,880 B2 | 4/2004 | Oshima et al. | |
| 6,855,171 B2 | 2/2005 | Morlacchi | |
| 6,971,135 B2 | 12/2005 | Nadler | |
| 6,984,281 B2 | 1/2006 | Oshima et al. | |
| 6,994,532 B2 * | 2/2006 | Vachon | A43B 5/0415 264/DIG. 30 |
| 6,994,765 B2 | 2/2006 | Oshima et al. | |
| 7,013,580 B2 | 3/2006 | Morlacchi | |
| 7,166,249 B2 | 1/2007 | Abrams et al. | |
| 7,346,953 B1 | 3/2008 | Graves | |
| 7,563,341 B2 | 7/2009 | Ferguson et al. | |
| 7,930,837 B1 | 4/2011 | Huebner | |
| 7,945,343 B2 | 5/2011 | Jones et al. | |
| 7,950,432 B2 | 5/2011 | Langvin et al. | |
| 8,162,022 B2 | 4/2012 | Hull et al. | |
| 8,539,692 B1 | 9/2013 | Huebner | |
| 8,549,688 B2 | 10/2013 | Leitner et al. | |
| 8,578,534 B2 | 11/2013 | Langvin et al. | |
| 8,961,723 B2 | 2/2015 | Langvin et al. | |
| 9,107,479 B2 | 8/2015 | Hanson et al. | |
| 2002/0023306 A1 | 2/2002 | Sajedi et al. | |
| 2002/0069557 A1 | 6/2002 | Miller et al. | |
| 2003/0046778 A1 | 3/2003 | Sicurelli, Jr. | |
| 2003/0115679 A1 | 6/2003 | Morlacchi et al. | |
| 2005/0241081 A1 | 11/2005 | Nadler | |
| 2006/0005328 A1 | 1/2006 | Johnson | |
| 2006/0024455 A1 | 2/2006 | Oshima et al. | |
| 2006/0123567 A1 | 6/2006 | Morlacchi | |
| 2007/0033750 A1 | 2/2007 | Cook et al. | |
| 2007/0079928 A1 | 4/2007 | Abrams et al. | |
| 2007/0130805 A1 | 6/2007 | Brady et al. | |
| 2007/0151656 A1 | 7/2007 | Gager et al. | |
| 2007/0185372 A1 | 8/2007 | Anderson et al. | |
| 2007/0200264 A1 | 8/2007 | Prutzman et al. | |
| 2008/0028544 A1 | 2/2008 | Park | |
| 2008/0127426 A1 | 6/2008 | Morlacchi et al. | |
| 2008/0141469 A1 | 6/2008 | Park | |
| 2008/0147219 A1 | 6/2008 | Jones et al. | |
| 2008/0250668 A1 | 10/2008 | Marvin et al. | |
| 2009/0019648 A1 | 1/2009 | Jones et al. | |
| 2010/0084083 A1 | 4/2010 | Hull et al. | |
| 2010/0139853 A1 | 6/2010 | Park | |
| 2010/0275393 A1 | 11/2010 | Jou et al. | |
| 2010/0326591 A1 | 12/2010 | Langvin et al. | |
| 2011/0088282 A1 | 4/2011 | Dojan et al. | |
| 2011/0277250 A1 | 11/2011 | Langvin et al. | |
| 2012/0096654 A1 | 4/2012 | Huebner | |

(56) References Cited

U.S. PATENT DOCUMENTS

| | | |
|---|---|---|
| 2013/0291317 A1 | 11/2013 | Hanson et al. |
| 2014/0075688 A1 | 3/2014 | Langvin et al. |
| 2015/0189953 A1 | 7/2015 | Langvin et al. |

FOREIGN PATENT DOCUMENTS

| | | | |
|---|---|---|---|
| CN | 2590406 | Y | 12/2003 |
| DE | 216937 | | 2/1909 |
| DE | 3805721 | A1 | 12/1988 |
| DE | 10118969 | A1 | 1/2002 |
| EP | 0264898 | A2 | 4/1988 |
| EP | 1000731 | A1 | 5/2000 |
| EP | 1635665 | A1 | 3/2006 |
| FR | 988355 | A | 8/1951 |
| FR | 2200735 | A6 | 4/1974 |
| GB | 191006015 | A | 0/1911 |
| JP | 9207149 | | 8/1997 |
| JP | 2004105323 | A | 4/2004 |
| WO | 9003744 | A1 | 4/1990 |
| WO | 9008487 | A1 | 8/1990 |
| WO | 9415494 | A1 | 7/1994 |
| WO | 9629208 | A1 | 9/1996 |
| WO | 02072301 | A1 | 9/2002 |
| WO | 02094581 | A1 | 11/2002 |
| WO | 2004112525 | A1 | 12/2004 |
| WO | 2006095375 | A2 | 9/2006 |
| WO | 2007007369 | A1 | 1/2007 |
| WO | 2011082275 | A1 | 7/2011 |

OTHER PUBLICATIONS

International Preliminary Report on Patentability and Written Opinion for Application No. PCT/US2010/039306, mailed Jan. 12, 2012.
International Search Report for Application No. PCT/US2002/07617, mailed Jul. 11, 2002.
Taiwanese Office Action issued Dec. 16, 2015 in Taiwanese Patent Application No. 99116338.
The First Office Action for Chinese Application No. 201410106546.5, mailed on May 24, 2016, 12 pages.

\* cited by examiner

METHOD OF USING AN INFLATABLE MEMBER TO CUSTOMIZE AN ARTICLE

CROSS-REFERENCE TO RELATED APPLICATIONS

This application is a division of U.S. patent application Ser. No. 14/032,433, entitled "Method of Using an Inflatable Member to Customize an Article", filed on Sep. 20, 2013, which application is a division of U.S. patent application Ser. No. 13/093,238, entitled "Inflatable Member", filed on Apr. 25, 2011 and issued on Nov. 12, 2013 as U.S. Pat. No. 8,578,534, which application is a continuation-in-part of U.S. patent application Ser. No. 12/490,954, entitled "Method of Customizing an Article and Apparatus Including an Inflatable Member", filed on Jun. 24, 2009 and issued on May 31, 2011 as U.S. Pat. No. 7,950,432, the disclosure of which applications are hereby incorporated by reference in their entirety.

BACKGROUND

The present embodiments relate generally to articles of footwear, and in particular to an inflatable member for fitting articles of footwear.

SUMMARY

In one aspect, an inflatable member configured to be inserted into an article includes an outer layer and an interior chamber disposed within the outer layer. The inflatable member also includes an adjustable portion disposed inside the interior chamber, an adjustment assembly configured to move the adjustable portion and a fluid port providing fluid communication between the interior chamber and an external source of fluid. The size of the inflatable member may be adjusted by inflating the interior chamber and changing the position of the adjustable portion.

In another aspect, an inflatable member configured to be inserted into an article includes an outer layer and an interior chamber disposed within the outer layer, a fluid port providing fluid communication between the interior chamber and an external source of fluid, where the fluid port may be used to inflate the interior chamber and an adjustable portion disposed inside the interior chamber, where the position of the adjustable portion can be changed. The adjustable portion is configured to reinforce a portion of the outer layer and the adjustable portion is substantially more rigid than the outer layer.

In another aspect, a method of applying a graphic to an article includes filling an inflatable member with fluid, changing the position of an adjustable portion disposed inside the inflatable member, the position being selected according to the size of the article, associating the article with the inflatable member and associating the graphic with a surface of the article. The method further includes pressing a deformable membrane against a portion of the article so that the deformable membrane conforms to the surface, heating the deformable membrane and transferring the graphic to the surface.

In another aspect, a method of adjusting the width of an article of footwear includes inserting an inflatable member into an article of footwear, where the article of footwear having an initial width and where the inflatable member has an outer layer that can expand and an adjustable portion disposed inside the outer layer. The method also includes controlling the adjustable portion to increase the width of the article of footwear to a predetermined width that is greater than the initial width.

In another aspect, a method of adjusting the width of an article of footwear includes using an inflatable member to determine a customized fit for a user, where the customized fit includes a first width. The method also includes inserting the inflatable member into an article of footwear, where the article of footwear has a second width that is substantially different than the first width. The inflatable member includes an outer layer that can expand and an adjustable portion disposed inside the outer layer. The method also includes controlling the adjustable portion to increase the second width of the article of footwear to the first width.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and detailed description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
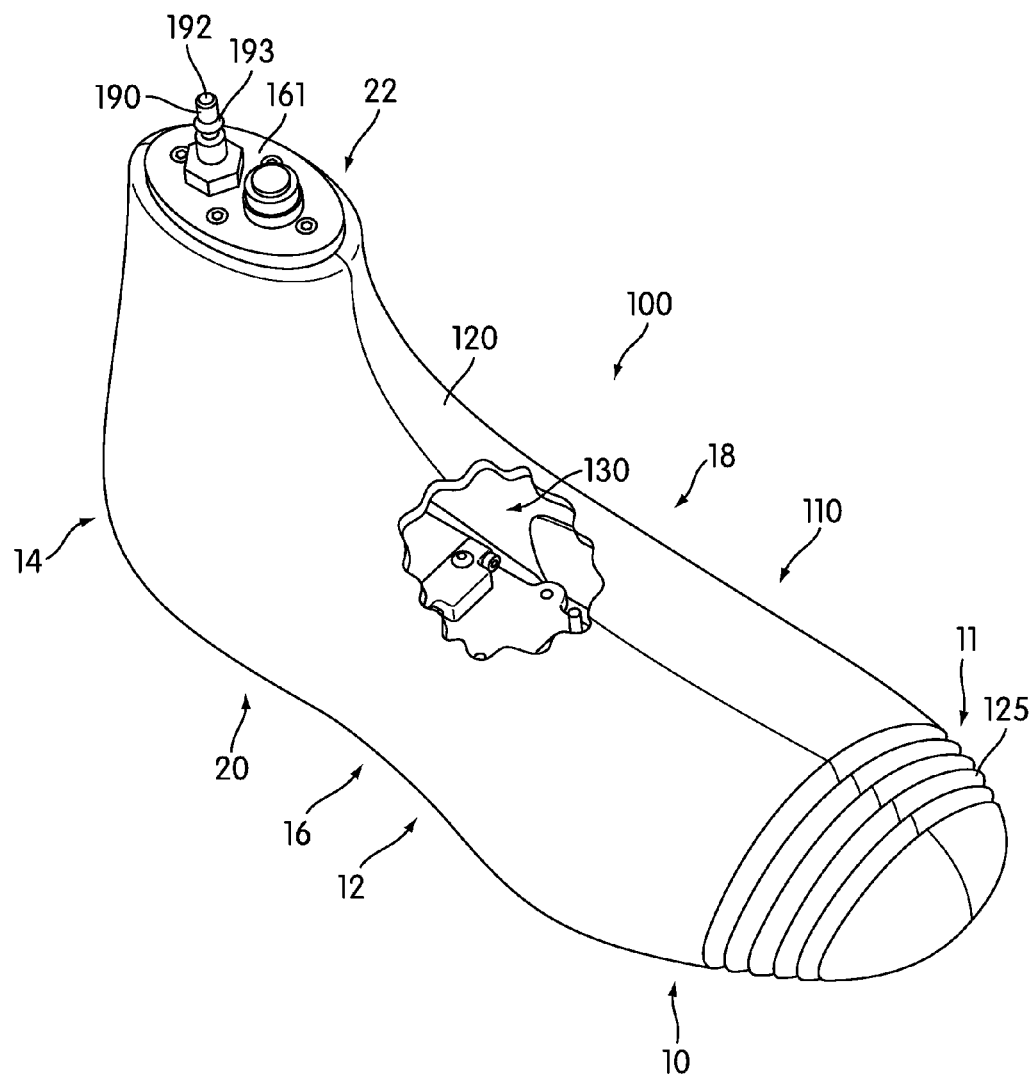
FIG. 1 is an isometric view of an embodiment of an inflatable member.
Figure 2:
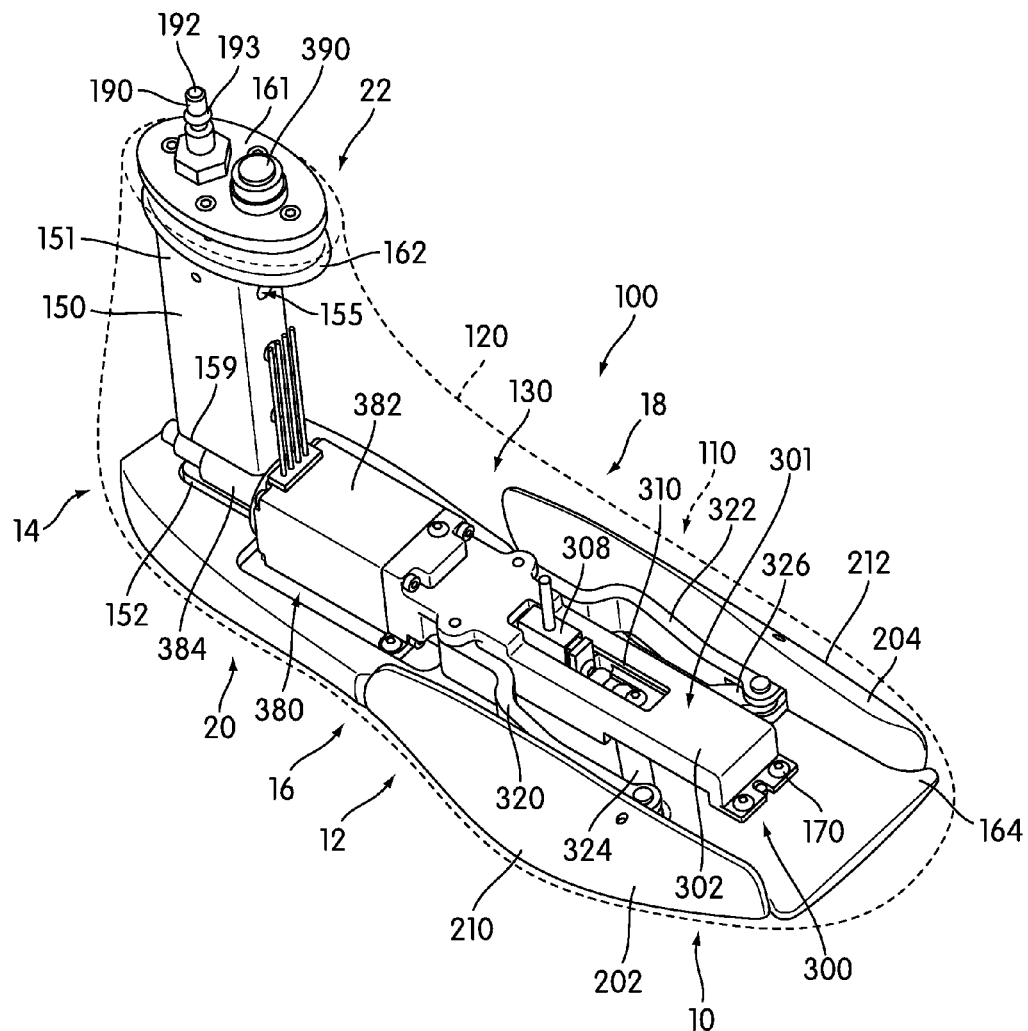
FIG. 2 is an isometric internal view of an embodiment of an inflatable member.
Figure 3:
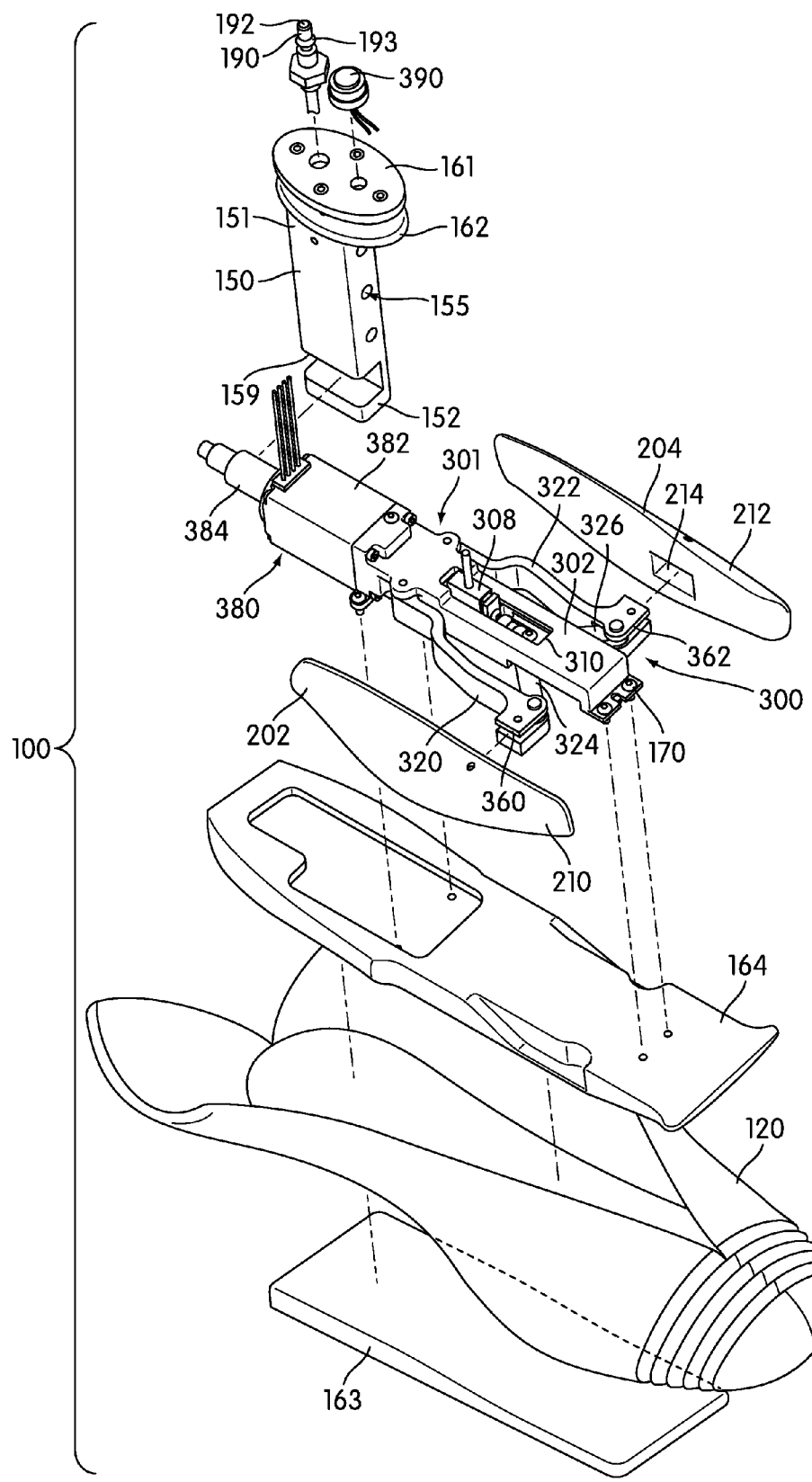
FIG. 3 is an exploded isometric view of an embodiment of some components of an inflatable member.
Figure 4:
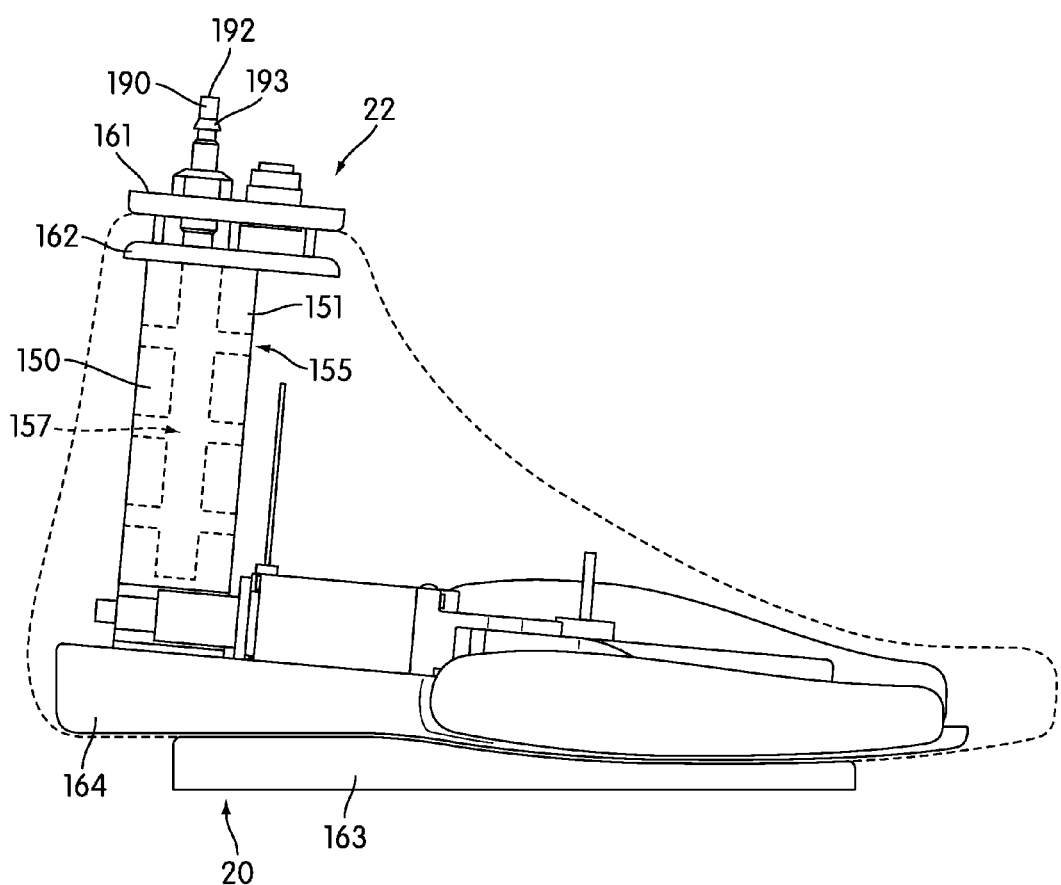
FIG. 4 is a side view of an embodiment of an interior portion of an inflatable member.

FIGS. 1 through 4 illustrate views of an embodiment of an inflatable member 100. In particular, FIG. 1 illustrates an isometric view of the exterior of an embodiment of inflatable member 100. FIGS. 2 and 3 illustrate an isometric view and an exploded isometric view, respectively, of the interior of inflatable member 100. FIG. 4 illustrates a side view of the interior of an embodiment of inflatable member 100. The term "inflatable member" as used throughout this detailed description and in the claims refers to any member that may undergo some degree of expansion upon being filled with a fluid of some kind.

In some embodiments, an inflatable member may be inserted into an existing article or object. In other embodiments, an article may be made using an inflatable member. For example, in some cases, an inflatable member may take the form of a last that is used to manufacture an article of footwear. In one embodiment, inflatable member 100 may take the form of a last. In some cases, inflatable member 100 may have the shape of a shoe last. In other embodiments, however, inflatable member 100 could have any other geometry and/or size. In embodiments where inflatable member 100 is intended for use with footwear, inflatable member 100 could be used with any type of footwear including, but not limited to: hiking boots, soccer shoes, football shoes, sneakers, rugby shoes, basketball shoes, baseball shoes as well as other kinds of shoes. Inflatable member 100 may also be used with any type of non-athletic shoe, including, but not limited to: dress shoes, loafers, sandals, and boots. An individual skilled in the relevant art will appreciate, therefore, that the concepts disclosed herein apply to a wide variety of footwear styles, in addition to the specific style discussed in the following material and depicted in the accompanying figures.

While the illustrated embodiments are directed towards an inflatable member in the form of footwear last, other embodiments can be used for fitting other kinds of articles or objects. Examples of other types of articles that could be used with a graphic transfer assembly include, but are not limited to: shirts, pants, hats, gloves, socks, any other garments as well as any other type of article. For example, in another embodiment, an inflatable member could be shaped similar to a head and may be used with a baseball cap.

As shown in FIG. 1, inflatable member 100, also referred to simply as member 100, is intended to be used with a right shoe; however, it should be understood that the following discussion may equally apply to a mirror image of member 100 that is intended for use with a left shoe.

Referring to FIG. 1, for purposes of reference, inflatable member 100 may be divided into forefoot portion 10, midfoot portion 12, and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, inflatable member 100 may include lateral side 16 and medial side 18. In particular, lateral side 16 and medial side 18 may be opposing sides of inflatable member 100. Furthermore, both lateral side 16 and medial side 18 may extend through forefoot portion 10, midfoot portion 12, and heel portion 14.

It will be understood that forefoot portion 10, midfoot portion 12, and heel portion 14 are only intended for purposes of description and are not intended to demarcate precise regions of inflatable member 100. Likewise, lateral side 16 and medial side 18 are intended to represent generally two sides of an article, rather than precisely demarcating inflatable member 100 into two halves. In addition, forefoot portion 10, midfoot portion 12, and heel portion 14, as well as lateral side 16 and medial side 18, can also be applied to individual components of an inflatable member.

For consistency and convenience, directional adjectives are employed throughout this detailed description corresponding to the illustrated embodiments. The term "longitudinal" as used throughout this detailed description and in the claims refers to a direction extending a length or major axis of a member. In some cases, the longitudinal direction may extend from a forefoot portion to a heel portion of the member. Also, the term "lateral" as used throughout this detailed description and in the claims refers to a direction extending a width or minor axis of a member. In other words, the lateral direction may extend between a medial side and a lateral side of a member. Furthermore, the term "vertical" as used throughout this detailed description and in the claims refers to a direction generally perpendicular to a lateral and longitudinal direction. For example, in cases where a member is planted flat on a ground surface, the vertical direction may extend from the ground surface upward. It will be understood that each of these directional adjectives may be applied to individual components of an inflatable member.

In some embodiments, an inflatable member can be used to adjust the size and/or shape of an article, such as an article of footwear. For example, an inflatable member can include provisions to adjust the width of an upper for an article of footwear as discussed in detail below.

In some embodiments, an inflatable member can be used with a graphic transfer assembly. A graphic transfer assembly may be an apparatus or system used to apply customized graphics to three dimensional articles, such as footwear or clothing. Examples of graphic transfer assemblies are disclosed in Hull et al., U.S. patent application Ser. No. 12/245,402, filed on Oct. 3, 2008, and issued on Apr. 24, 2012 as U.S. Pat. No. 8,162,022, the entirety of which is hereby incorporated by reference and referred to throughout the remainder of this detailed description as the "Hull case". Examples of graphic transfer assemblies are also disclosed in Rapaport et al., U.S. patent application Ser. No. 12/490,954, filed on Jun. 24, 2009, and issued on May 31, 2011 as U.S. Pat. No. 7,950,432, the entirety of which is hereby incorporated by reference and referred to throughout the remainder of this detailed description as the "Rapaport case". By using an inflatable member, a graphic can be applied to various portions of articles using a graphic transfer assembly, since the inflatable member provides firm support for curved portions of the article.

In some embodiments, an inflatable member could be used to manufacture articles. For example, in some cases, an inflatable member in the form of a footwear last could be used to manufacture footwear. In particular, various materials could be assembled over the inflatable member to form an article having a similar geometry to the inflatable member.

It will be understood that in other embodiments, an inflatable member could be used in conjunction with any other systems or devices. In particular, an inflatable member is not limited to use with a graphic transfer assembly or in conjunction with resizing and/or manufacturing footwear.

In some embodiments, inflatable member 100 may comprise body portion 110 (see FIG. 1). In some cases, body portion 110 may be configured as a substantially monolithic portion. In other cases, body portion 110 can comprise multiple distinct portions.

In some embodiments, inflatable member 100 may comprise outer layer 120. Outer layer 120 may form an outer surface for body portion 110. Moreover, outer layer 120 may enclose interior chamber 130. Generally, interior chamber 130 can have any size and shape that fits within the boundaries of outer layer 120. In particular, the size and shape of interior chamber 130 may vary with the thickness of outer layer 120. Although the current embodiment includes a single interior chamber that extends throughout a substantial entirety of body portion 110, in other embodiments, two or more chambers can be used. In some cases, in embodiments where two or more chambers are used, the chambers can be in fluid communication. In other cases, in embodiments where two or more chambers are used, the chambers may not be in fluid communication.

Generally, the material properties of outer layer 120 may vary. In some embodiments, outer layer 120 can be made of a substantially flexible and resilient material that is configured to deform under fluid forces. In some cases, outer layer 120 can be made of a plastic material. Examples of plastic materials that may be used include high density polyvinylchloride (PVC), polyethylene, thermoplastic materials, elastomeric materials as well as any other types of plastic materials including combinations of various materials. In embodiments where thermoplastic polymers are used for outer layer 120, a variety of thermoplastic polymer materials may be utilized, including polyurethane, polyester, polyester polyurethane, and polyether polyurethane. Another suitable material for an outer layer is a film formed from alternating layers of thermoplastic polyurethane and ethylene-vinyl alcohol copolymer, as disclosed in Mitchell et al., U.S. Pat. Nos. 5,713,141 and 5,952,065, hereby incorporated by reference. Outer layer 120 may also be formed from a flexible microlayer membrane that includes alternating layers of a gas barrier material and an elastomeric material, as disclosed in Bonk et al., U.S. Pat. Nos. 6,082,025 and 6,127,026, both hereby incorporated by reference. In addition, numerous thermoplastic urethanes may be utilized, such as PELLETHANE, a product of the Dow Chemical Company; ELASTOLLAN, a product of the BASF Corporation; and ESTANE, a product of the B. F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Additional suitable materials are disclosed in Rudy, U.S. Pat. Nos. 4,183,156 and 4,219,945, hereby incorporated by reference. Further suitable materials include thermoplastic films containing a crystalline material, as disclosed in Rudy, U.S. Pat. Nos. 4,936,029 and 5,042,176, hereby incorporated by reference, and polyurethane including a polyester polyol, as disclosed in Bonk et al., U.S. Pat. Nos. 6,013,340; 6,203,868; and 6,321,465, also hereby incorporated by reference.

Since heat and/or pressure may be applied to an inflatable member (for example, when using the inflatable member with a graphic transfer assembly or when stretching the width of an article of footwear) an inflatable member can include provisions for withstanding heat. In some embodiments, the inflatable member can be made of a material that does not degrade or substantially deform when heated. In other embodiments, the inflatable member can be treated with one or more heat resistant materials. In one embodiment, an inflatable member can comprise materials that are capable of withstanding a predetermined amount of heat.

In different embodiments, the structure of outer layer 120 can vary. In some cases, outer layer 120 may have a substantially smooth outer surface. In other cases, outer layer 120 may be provided with various surface features including, but not limited to: ribs, ridges, dimples, bumps as well as other kinds of surface features. In one embodiment, toe portion 11 of forefoot portion 10 of outer layer 120 is provided with ribbed portion 125, while the remaining portions of outer layer 120 may be substantially smooth. Using this arrangement, forefoot portion 10 of inflatable member 100 may provide enhanced grip inside the toe portion of an article of footwear.

In some embodiments, an inflatable member can include various additional features including inflatable portions. Inflatable portions could be independently inflatable regions of an inflatable member disposed. In some cases, the inflatable portions could be disposed on an outer layer of an inflatable member.

Inflatable member 100 can include structural components that help facilitate inflation and that provide increased structural integrity for the inflatable member. In some embodiments, inflatable member 100 may comprise support member 150, which is disposed within interior chamber 130 of inflatable member 100. In some cases, support member 150 may extend between bottom portion 20 and top portion 22 of inflatable member 100. In other words, support member 150 may extend in a generally vertical direction through inflatable member 100. In other embodiments, however, support member 150 could extend through inflatable member 100 in another direction.

Generally, support member 150 may be configured with any shape. In the exemplary embodiment, support member 150 can have a substantially rectangular cross-sectional shape. In other embodiments, however, support member 150 can have any other cross-sectional shape including, but not limited to, circular, oval, polygonal, regular, irregular, as well as any other kind of cross-sectional shape. In another embodiment, for example, support member 150 can be configured with a column-like geometry having a circular cross-sectional shape.

Generally, support member 150 may be attached to inflatable member 100 in any manner. In some embodiments, support member 150 may be fixedly attached to inflatable member 100. In other embodiments, support member 150 may be removably attached to inflatable member 100. In one embodiment, support member 150 may be fixedly attached to inflatable member 100 using support plates.

In some embodiments, inflatable member 100 may include first support plate 161 and second support plate 162. In some cases, first support plate 161 may be disposed on an external surface of top portion 22 of inflatable member 100. In addition, second support plate 162 may be disposed on an internal surface of top portion 22. In other words, second support plate 162 may be disposed within interior chamber 130 of inflatable member 100. Furthermore, first support plate 161 may be joined with second support plate 162 using one or more fasteners that are further inserted through top portion 22. In other words, top portion 22 is sandwiched between first support plate 161 and second support plate 162, which allows first support plate 161 and second support plate 162 to be anchored in place with respect to top portion 22.

In some embodiments, inflatable member 100 may include third support plate 163 and fourth support plate 164. In some cases, third support plate 163 may be disposed on an external surface of bottom portion 20 of inflatable member 100. In addition, fourth support plate 164 may be disposed on an internal surface of bottom portion 20. In other words, fourth support plate 164 may be disposed within interior chamber 130 of inflatable member 100. Furthermore, third support plate 163 may be joined with fourth support plate 164 using one or more fasteners that are further inserted through bottom portion 20. In other words, bottom portion 20 is sandwiched between third support plate 163 and fourth support plate 164, which allows third support plate 163 and fourth support plate 164 to be anchored in place with respect to bottom portion 20.

In one embodiment, support member 150 extends between support plates on top portion 22 and bottom portion 20. In particular, first end 151 of support member 150 is joined with second support plate 162. Also, second end 152 of support member 150 is joined with fourth support plate 164. With this arrangement, support member 150 may be held fixedly in place between top portion 22 and bottom portion 20.

In different embodiments, the geometries of one or more support plates can vary. In one embodiment, first support plate 161 and second support plate 162 can have substantially oval-like shapes. In some cases, the oval-like shapes for first support plate 161 and second support plate 162 correspond approximately to the shape of top portion 22. In addition, in one embodiment, third support plate 163 and fourth support plate 164 can have elongated shapes with rounded end portions. In some cases, the shapes of third support plate 163 and fourth support plate 164 can correspond approximately to the shape of bottom portion 20. In other embodiments, however, each support plate can have any other type of shape.

Although four support plates are used in the current embodiment, in other embodiments more or less than four support plates can be used. For example, in another embodiment, a first support plate may be disposed on a bottom portion of an inflatable member and a second support plate may be disposed on a top portion of an inflatable member. In some cases, the first support plate can be fastened directly to the bottom portion and the second support plate can be fastened directly to the top portion, rather than using a sandwiching arrangement as discussed above. Furthermore, in this alternative arrangement, the support member can be connected to the first support plate and the second support plate. Additionally, in still other embodiments, additional support plates can be provided on different portions of an inflatable member, including lateral side portions and/or medial side portions. Another arrangement for a support member and support plates is discussed in the Rapaport case.

Inflatable member 100 can include provisions for delivering fluid into interior chamber 130. In some embodiments, inflatable member 100 may include valve 190. Valve 190 includes fluid port 192 that is in fluid communication with interior chamber 130 of inflatable member 100. Generally, valve 190 can be any type of valve known in the art for controlling the flow of fluid between two regions. For example, in one embodiment, valve 190 may comprise a one-way valve that helps to prevent fluid from leaving interior chamber 130 but allows air to enter interior chamber 130. In other embodiments, any other provisions known in the art for controlling the flow of fluids into or out of an inflatable device can be used.

Valve 190 can be associated with any portion of inflatable member 100. In some cases, valve 190 may be disposed on outer layer 120. In other cases, valve 190 may be mounted to a support plate. In one embodiment, valve 190 may be mounted to first support plate 161. This arrangement may help to maintain the structural integrity of the connection between valve 190 and inflatable member 100.

In embodiments where inflatable member 100 is used with a graphic transfer assembly, valve 190 may also provide a means of mounting inflatable member 100 to the graphic transfer assembly. For example, valve 190 could include threading 193 that can be screwed into a post or stem of a graphic transfer assembly.

In some embodiments, support member 150 may be partially hollow. Moreover, support member 150 can comprise one or more fluid ports that are open on the sidewalls of support member 150. For example, in one embodiment, support member 150 may comprise fluid port set 155. Generally, fluid port set 155 can comprise any number of fluid ports. Furthermore, each of the fluid ports of fluid port set 155 are in fluid communication with a hollow channel 157 (see FIG. 4) of support member 150.

In some cases, valve 190 may be in fluid communication with hollow channel 157. Fluid introduced through valve 190 may therefore enter hollow channel 157, and eventually interior chamber 130 by way of fluid port set 155. In other words, fluid port 192 of valve 190 may be in fluid communication with fluid port set 155 of support member 150. With this arrangement, fluid may flow between an external fluid source connected to valve 190 and interior chamber 130. This provides a mechanism for inflating inflatable member 100. Another example of an arrangement for introducing fluid into an interior chamber is described in the Rapaport case.

Generally, an inflatable member can be filled with any type of fluid including gas or liquid. In some cases, an inflatable member can be configured to receive a gas including, but not limited to: air, hydrogen, helium, nitrogen or any other type of gas. In other cases, the inflatable member can be configured to receive a liquid, such as water or any other type of liquid. In one embodiment, a fluid used to fill an inflatable member can be selected according to desired properties such as compressibility.

An inflatable member can include provisions for enhancing support along various portions of the inflatable member. In some cases, an inflatable member can include supporting structures that reinforce portions of an outer layer to improve shape and enhance rigidity. In some embodiments, an inflatable member can include adjustable portions that reinforce portions of an outer layer and help provide a desired geometry for the outer layer.

Referring now to FIGS. 2 and 3, inflatable member 100 may include first adjustable portion 202 and second adjustable portion 204. First adjustable portion 202 may be disposed on lateral side 16 of inflatable member 100, while second adjustable portion 204 may be disposed on medial side 18 of inflatable member 100. In some cases, first adjustable portion 202 may be disposed on lateral side 16 of forefoot portion 10. Moreover, first adjustable portion 202 has a geometry that corresponds to a lateral side of a foot. In particular, first adjustable portion 202 includes contoured surface 210, which is disposed against outer layer 120. Likewise, second adjustable portion 204 may be disposed on medial side 18 of forefoot portion 10. Second adjustable portion 204 has a geometry that corresponds to a medial side of a foot. In particular, second adjustable portion 204 includes contoured surface 212, which is disposed against outer layer 120.

Using this arrangement, first adjustable portion 202 and second adjustable portion 204 may act to reinforce lateral side 16 and medial side 18, respectively, of outer layer 120 along forefoot portion 10. In particular, first adjustable portion 202 and second adjustable portion 204 help to provide the desired shape for forefoot portion 10 of inflatable member 100.

In different embodiments, the material properties of first adjustable portion 202 and second adjustable portion 204 could vary. In some cases, first adjustable portion 202 and second adjustable portion 204 could be substantially rigid portions. In other cases, first adjustable portion 202 and second adjustable portion 204 could be substantially flexible portions. Moreover, in some cases, first adjustable portion 202 and second adjustable portion 204 could be substantially more rigid than outer layer 120. In other cases, first adjustable portion 202 and second adjustable portion 204 could be substantially less rigid than outer layer 120. In embodiments where first adjustable portion 202 and second adjustable portion 204 are substantially more rigid than outer layer 120, first adjustable portion 202 and second adjustable portion 204 may provide enhanced support to outer layer 120. In particular, this arrangement helps provide a well defined contoured geometry for inflatable member 100, which is useful for increasing the width of an article.

Inflatable member 100 may further include adjustment assembly 300. Adjustment assembly 300 comprises linkage assembly 301 and motor assembly 380. Adjustment assembly 300 includes central linkage portion 302. Central linkage portion 302 may include slider assembly 308 that can slide within slot 310. Adjustment assembly 300 also includes first outer linkage arm 320, second outer linkage arm 322, first inner linkage arm 324 and second inner linkage arm 326. First outer linkage arm 320 and second outer linkage arm 322 are connected in a pivoting arrangement to second adjustable portion 204 of central linkage portion 302. First inner linkage arm 324 and second inner linkage arm 326 are connected in a pivoting arrangement with slider assembly 308. Moreover, first inner linkage arm 324 is connected in a pivoting arrangement with first outer linkage arm 320 and second inner linkage arm 326 is connected in a pivoting arrangement with second outer linkage arm 322. In some cases, adjustment assembly 300 may be designed so that as slider assembly 308 is moved to a forwards position within slot 310, first inner linkage arm 324 and second inner linkage arm 326 are pushed outwardly. Also, as slider assembly 308 is moved to a rearwards position within slot 310, first inner linkage arm 324 and second inner linkage arm 326 are pulled inwardly.

In some embodiments, first adjustable portion 202 and second adjustable portion 204 are connected to adjustment assembly 300. In some cases, first adjustable portion 202 may be connected to flange portion 360 of first outer linkage arm 320. Flange portion 360 may be disposed adjacent to the pivoting connection between first outer linkage arm 320 and first inner linkage arm 324. In some cases, first adjustable portion 202 may include a recess (not shown) for receiving flange portion 360. Moreover, first adjustable portion 202 may be connected to flange portion 360 by a pin, screw or any other type of fastener.

In some cases, second adjustable portion 204 may be connected to flange portion 362 of second outer linkage arm 322. Flange portion 362 may be disposed adjacent to the pivoting connection between second outer linkage arm 322 and second inner linkage arm 326. In some cases, second adjustable portion 204 may include recess 214 for receiving flange portion 362. Moreover, second adjustable portion 204 may be connected to flange portion 362 by a pin, screw or any other type of fastener. With this arrangement, the positions of first adjustable portion 202 and second adjustable portion 204 may be moved using linkage assembly 301. This feature is discussed in further detail below.

Although the current embodiment comprises a linkage assembly that moves a first adjustable portion and second adjustable portion simultaneously, in other embodiments a first adjustable portion and a second adjustable portion could be moved independently of one another. In some cases, for example, a separate linkage mechanism could be used with each adjustable portion. In other cases, other means for moving each adjustable portion in an independent manner could be used.

Although the current embodiment illustrates an example where adjustable portions are disposed inside an outer layer of an inflatable member, in other embodiments one or more adjustable portions could also be disposed outside of an outer layer. In another embodiment, for example, the adjustable portions could be connected to an adjustment assembly through an opening in an outer layer. In such cases, the opening could be sealed to prevent leaking. In still other cases, some adjustable portions could be disposed inside an outer layer while other adjustable portions are disposed outside of the outer layer.

Motor assembly 380 may be disposed adjacent to linkage assembly 301. In some cases, motor assembly 380 may comprise motor compartment 382 and electrical port 384. Motor compartment 382 may contain an electrical motor or any other type of motor configured to generate power for actuating linkage assembly 301. In some cases, motor compartment 382 is connected to slider assembly 308 in order to move slider assembly 308 within slot 310. As slider assembly 308 is positioned at different locations within slot 310, linkage assembly 301 acts to extend or retract first adjustable portion 202 and second adjustable portion 204.

In embodiments where motor assembly 380 is electrically operated, electrical port 384 may serve as a recharging port for powering any battery or power supply required to operate a motor. In some cases, a portion of electrical port 384 could extend through outer layer 120 so that electrical port 384 is exposed on an outer surface of inflatable member 100. This would allow for the recharging of motor assembly 380 through an external charging source. However, in other cases, electrical port 384 may be contained within outer layer 120 and not exposed. In one embodiment, electrical port 384 may extend through recessed portion 159 of support member 150.

Motor assembly 380 could be activated in any manner. In some cases, inflatable member 100 may include actuation button 390. In some embodiments, actuation button 390 could be exposed on top portion 22 of inflatable member 100. In some cases, actuation button 390 could be mounted to first support plate 161. This arrangement provides convenient access for actuating adjustment assembly 300. In other embodiments, actuation button 390 could be disposed on any other portion of inflatable member 100.

In the current embodiment, actuation button 390 is shown as a single button. For example, as actuation button 390 is depressed, slider assembly 308 may move from a rearward position to a forward position. Once slider assembly 308 reaches the forward position, slider assembly 308 could reverse direction and move towards the rearward position. This would allow a single button to be used to actuate slider assembly 308 in both a forwards and rearwards direction. In other cases, motor assembly 380 could be operated using multiple buttons. In some cases, a switch could be provided to change the direction of actuation.

Although the current embodiment uses an electrical motor to provide an actuating force for linkage assembly 301, other embodiments could include other sources of power. In some cases, hydraulic pressure could be used to actuate linkage assembly 301. In still other cases, any other mechanism could be used to actuate linkage assembly 301. In some embodiments, for example, linkage assembly 301 could be actuated manually using a lever or other mechanical device.

Adjustment assembly 300 could be associated with any portion of inflatable member 100. In some embodiments, adjustment assembly 300 may be mounted to third support plate 163. In some cases, adjustment assembly 300 could be mounted to third support plate 163 using screws 170. In other cases, adjustment assembly 300 could be attached to third support plate 163 using any other types of fasteners. In other embodiments, adjustment assembly 300 could be attached to third support plate 163 in any other manner. In still other embodiments, it will be understood that adjustment assembly 300 could be attached to any other portion of inflatable member 100. In an alternative embodiment, adjustment assembly 300 could be attached directly to outer layer 120.

Generally, the material properties of components of inflatable member 100 could vary. Examples of different materials that could be used include, but are not limited to: plastics, wood, metal, rubber as well as any other materials. For example, adjustment assembly 300 could comprise plastic components and/or metal components. First adjustable portion 202 and second adjustable portion 204 could be made of plastic, wood, rubber or metal. In some cases, support plates could be made of metal or plastic. Moreover, the materials used for each component could be varied according to one or more desired material properties for different portions of inflatable member 100.

Figure 5:
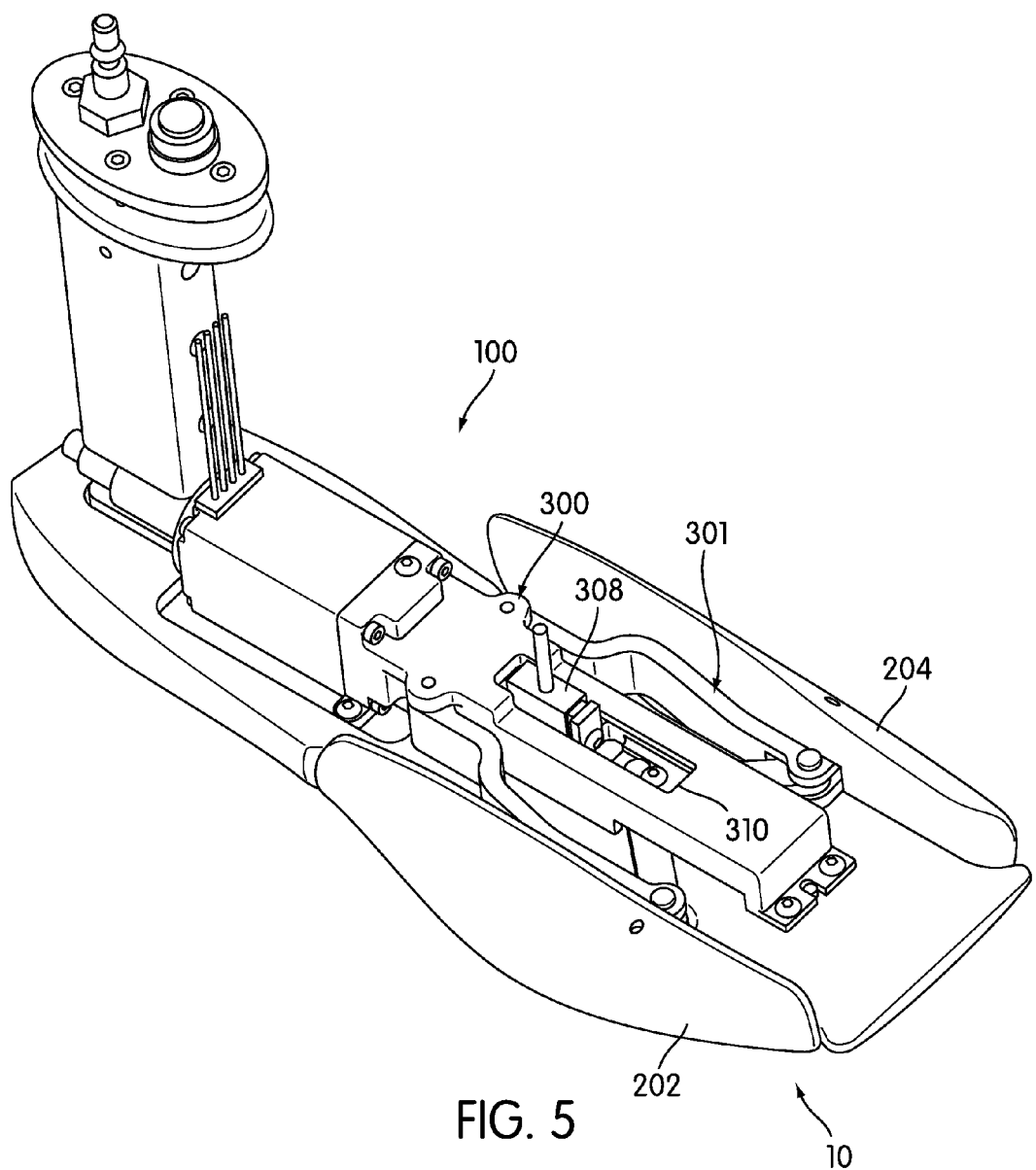
FIG. 5 is an isometric view of an embodiment of an inflatable member with an outer layer removed.
Figure 6:
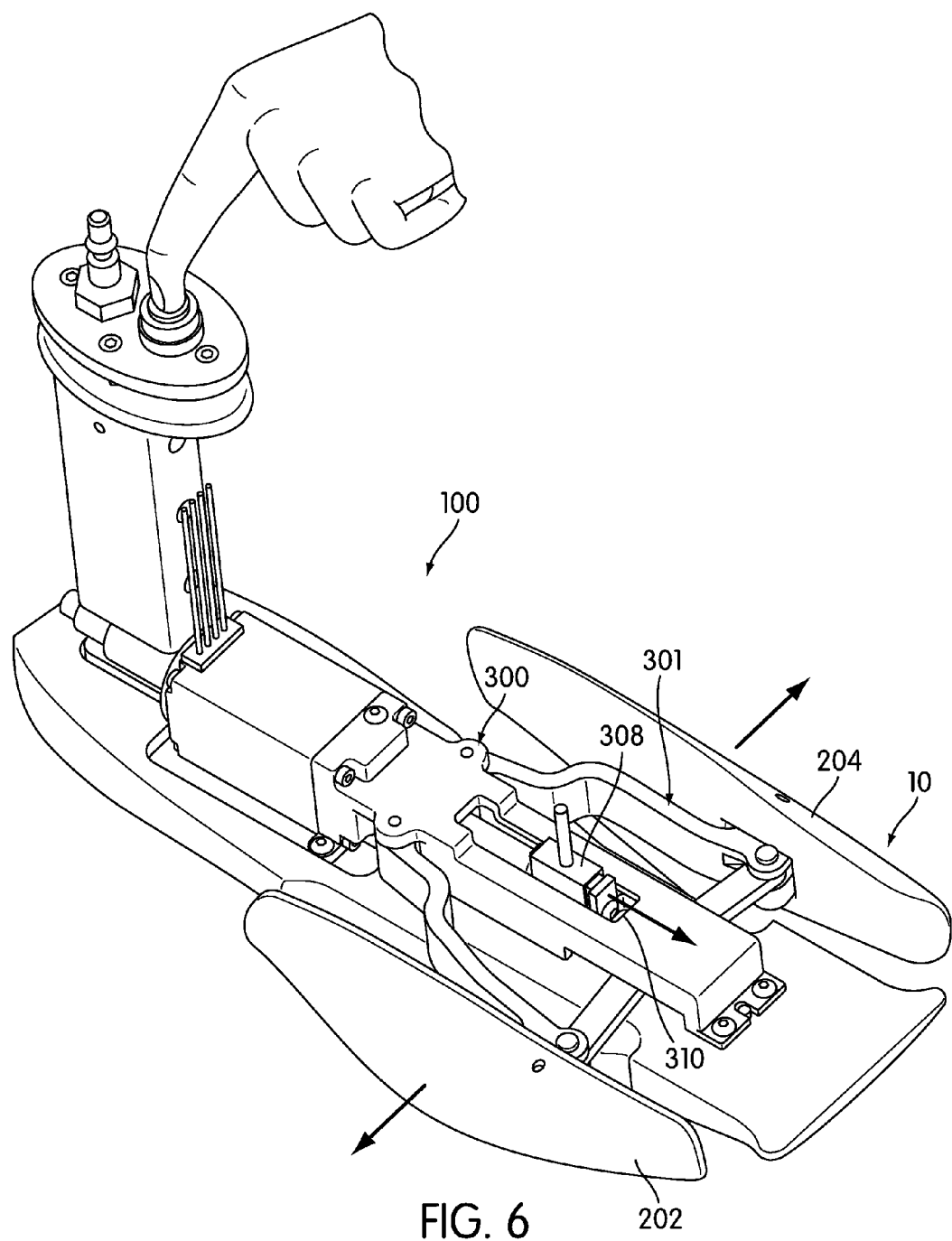
FIG. 6 is an isometric view of an embodiment of an inflatable member with an outer layer removed.

FIGS. 5 and 6 illustrate isometric views of the interior of inflatable member 100. For purposes of clarity, outer layer 120 is not shown. FIG. 5 shows adjustment assembly 300 in a retracted position. In this case, slider assembly 308 is in a rearward position within slot 310. In this retracted position, first adjustable portion 202 and second adjustable portion 204 are pulled closer to central linkage portion 302 of adjustment assembly 300. This retracted position may be used to accommodate articles of a relatively narrow width.

Referring now to FIG. 6, in some cases a user may adjust the width of forefoot portion 10 of inflatable member 100 by depressing actuation button 390. As actuation button 390 is depressed, adjustment assembly 300 is actuated. In particular, slider assembly 308 is moved forwards under forces generated by motor assembly 380. As slider assembly 308 moves forwards, linkage assembly 301 is extended. As linkage assembly 301 opens up, the linkage arms push out first adjustable portion 202 and second adjustable portion 204. This has the effect of increasing the width of forefoot portion 10.

Although FIG. 6 illustrates slider assembly 308 in a forward position within slot 310, it will be understood that slider assembly 308 can be moved to any position within slot 310. Moreover, as slider assembly 308 moves through slot 310 in a continuous manner, the positions of first adjustable portion 202 and second adjustable portion 204 are continuously adjusted. With this arrangement, the size forefoot portion 10 can be adjusted to accommodate various different sized articles. In some cases, the size of forefoot portion 10 can be adjusted to accommodate different widths for articles of footwear.

Figure 7:
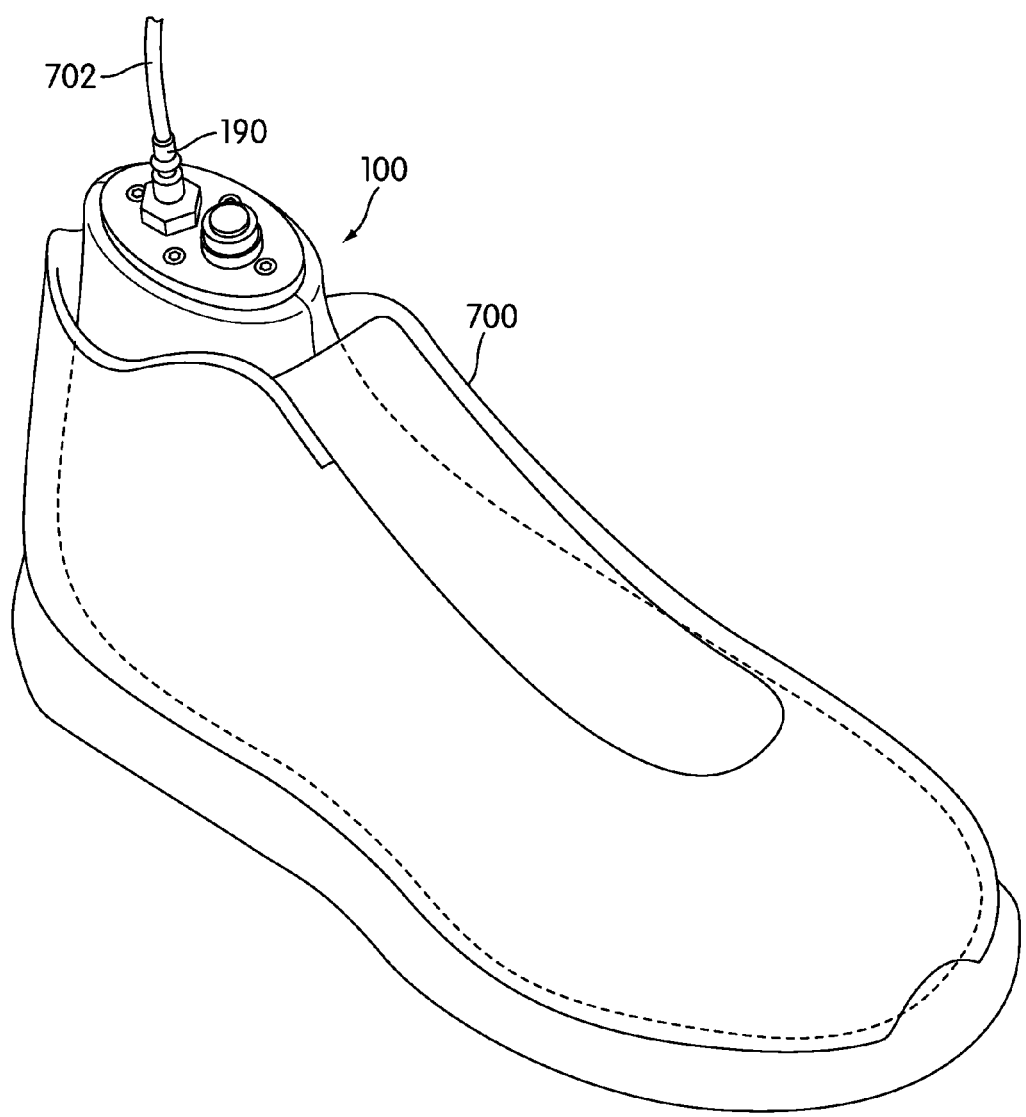
FIG. 7 is an isometric view of an embodiment of an inflatable member inserted into an article of footwear.

FIG. 7 illustrates an isometric view of inflatable member 100 inserted into article of footwear 700, hereby referred to simply as article 700. In this embodiment, fluid line 702 has been connected to valve 190. Fluid line 702 may be configured to deliver some kind of fluid, such as air, for purposes of inflating inflatable member 100. In one embodiment, this arrangement could be used to adjust the width of an article of footwear using inflatable member 100. For example, the width of article 700 can be increased by inserting inflatable member 100 into an article and expanding inflatable member 100 to a predetermined size in order to stretch the width of article 700.

In another embodiment, this arrangement could be used to measure the size of an article of footwear using inflatable member 100. In particular, by adjusting the size of inflatable member 100 until it fits article 700, the approximate shape and width of article 700 can be determined. This fitting information can then be used to adjust the sizes of other articles to achieve a similar fit.

In still another embodiment, this arrangement could be used for purposes of applying a graphic to article 700 using a graphic transfer assembly. In embodiments where inflatable member 100 is used with a graphic transfer assembly, the size of inflatable member 100 should be adjusted to ensure the surfaces of article 700 are firmly supported.

Figure 8:
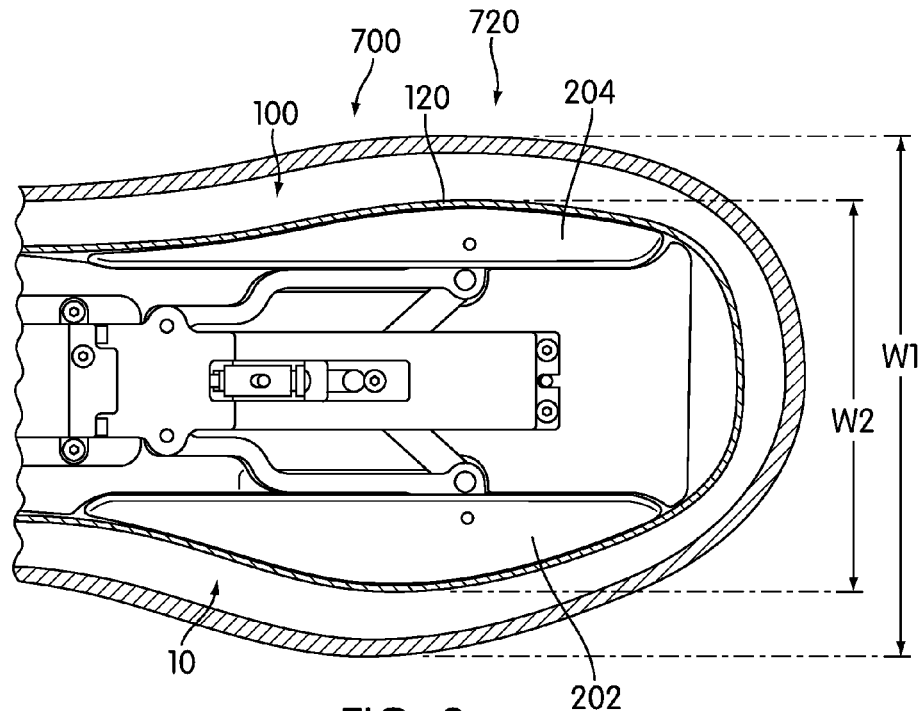
FIG. 8 is a cross-sectional view of an embodiment of a portion of an inflatable member inserted into an article of footwear.
Figure 9:
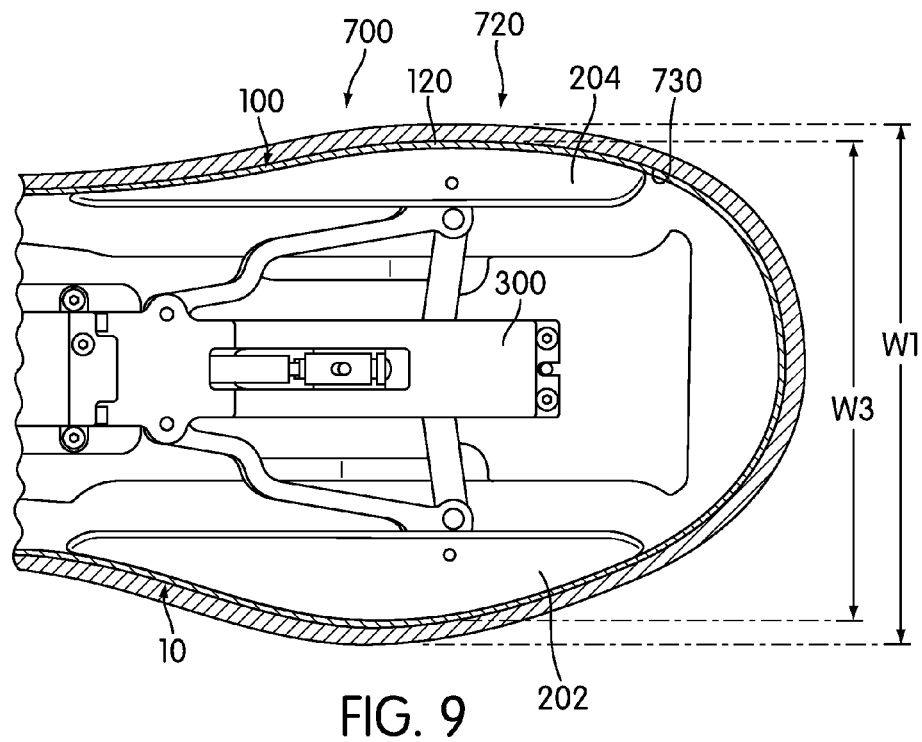
FIG. 9 is a cross-sectional view of an embodiment of a portion of an inflatable member inserted into an article of footwear.

Prior to inflation, the size of forefoot portion 10 may be automatically adjusted to accommodate the size of article 700. Referring now to FIG. 8, forefoot portion 720 of article 700 has width W1. Forefoot portion 10 of inflatable member 100 has width W2. In this case, width W2 is substantially less than width W1. Referring now to FIG. 9, adjustment assembly 300 may be activated so that the width of forefoot portion 10 expands. In particular, the width of forefoot portion 10 may expand until forefoot portion 10 has width W3, which is substantially similar to width W1 of forefoot portion 720 of article 700. In this configuration, first adjustable portion 202 and second adjustable portion 204 are disposed against interior surface 730 of article 700. This arrangement helps ensure that inflatable member 100 adapts to the overall shape and size of article 700.

In embodiments where inflatable member 100 is used with a graphic transfer assembly, this arrangement provides enhanced support for the lateral and medial sides of article 100. Moreover, this arrangement provides the desired contoured shape for the lateral and medial sides of inflatable member 100, which helps to ensure that the contours of article 700 are properly supported during the graphic transfer process.

Figure 10:
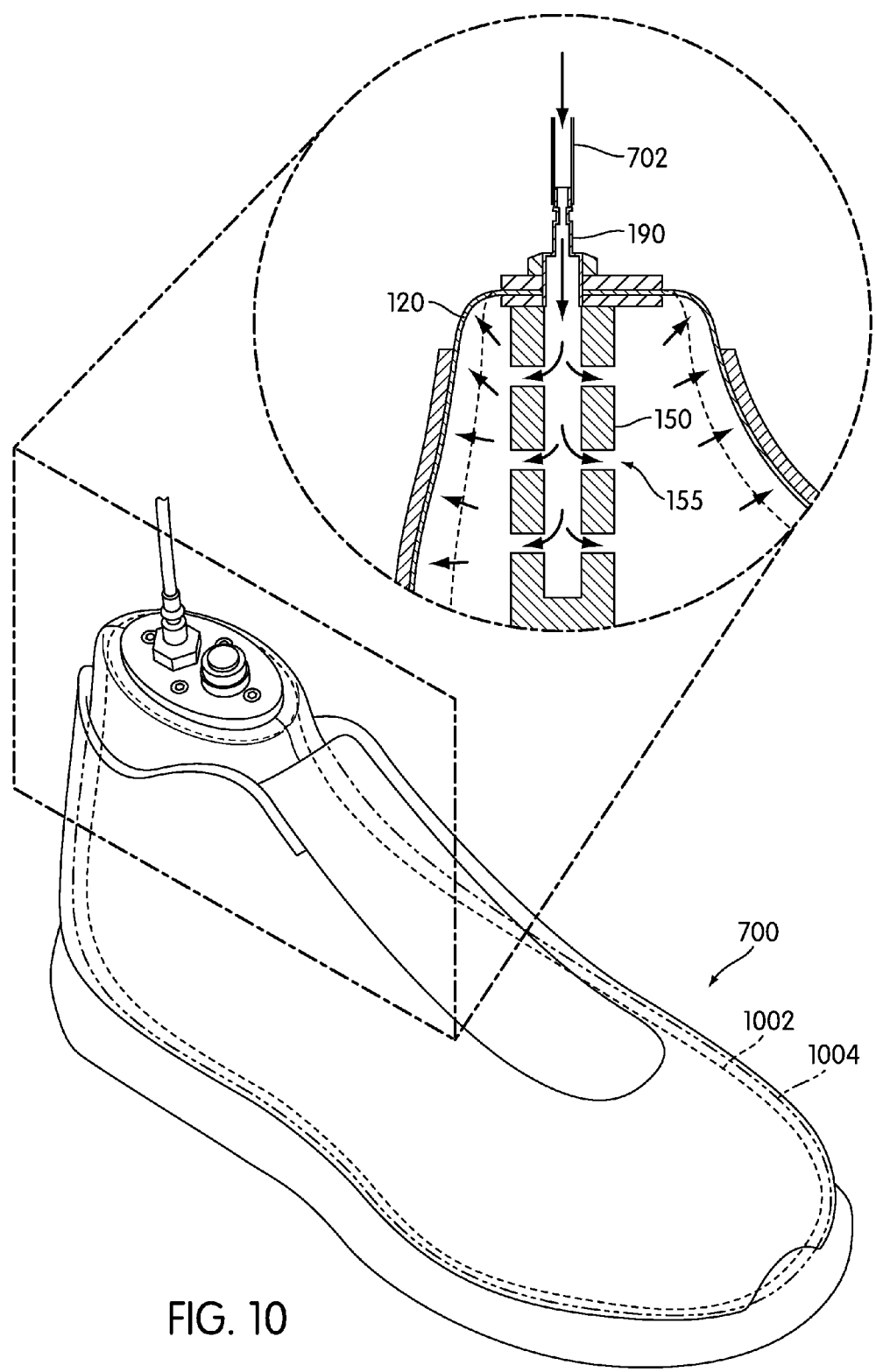
FIG. 10 is an isometric view of an embodiment of an inflatable member inflated to fit an article of footwear.

Referring now to FIG. 10, once the width of inflatable member 100 has been adjusted, inflatable member 100 can be inflated. As seen in FIG. 10, fluid may enter valve 190 through fluid line 702. The fluid may then pass through support member 150 and out fluid port set 155. As fluid fills inflatable member 100, outer layer 120 may expand to fill article 700. In this case, the initial size 1002 of inflatable member 100 is indicated schematically. The inflated size 1004 is also indicated schematically and is substantially larger than initial size 1002. Using this arrangement, the size of inflatable member 100 can be adjusted to different sizes of footwear in order to customize the fit of an article. In cases where an inflatable member is used with a graphic transfer assembly, using an inflatable member with adjustable portions may allow for a reduction in the number of lasts required to operate a graphic transfer assembly. In cases where the inflatable member is used to manufacture footwear, using an inflatable member with adjustable portions may allow for a reduction in the number of lasts required to make different sizes of footwear.

Figure 11:
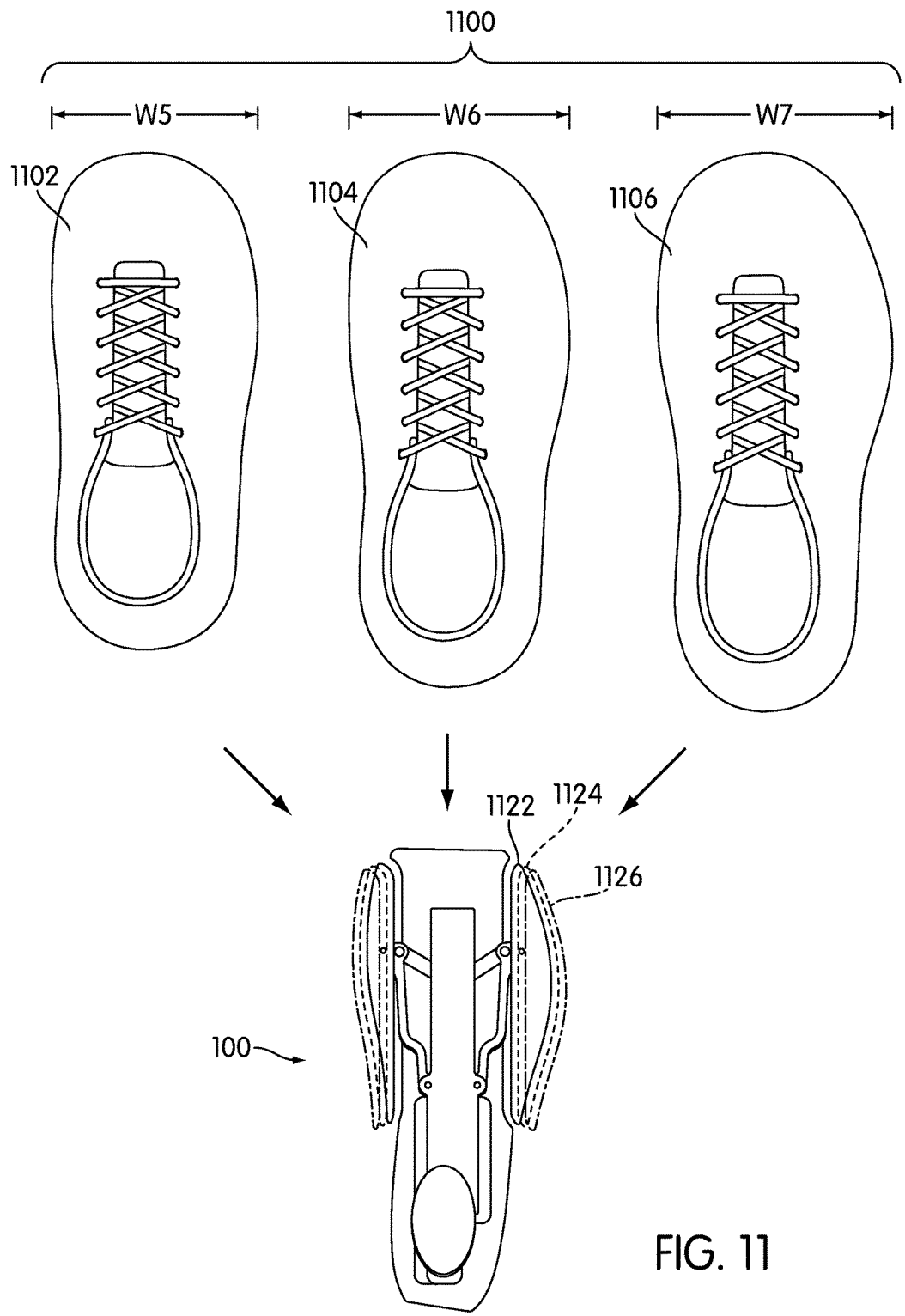
FIG. 11 is a schematic view of a set of footwear associated with an inflatable member.

FIG. 11 illustrates a schematic view of set of articles 1100, including first article 1102, second article 1104 and third article 1106. Each article has a slightly different width. For example, first article 1102 has a forefoot width W5, second article 1104 has a forefoot width W6 and third article 1106 has a forefoot width W7. Moreover, width W6 is substantially larger than width W5 and width W7 is substantially larger than width W6. In one embodiment of first article 1102, second article 1104, and third article 1106 may be associated with a different shoe size. For example, first article 1102 may be a size 9 article, second article 1104 may be a size 9½ article, and third article 1106 may be a size 10 article.

In one embodiment, set of articles 1100 may be associated with inflatable member 100. In particular, the positions of adjustable portions can be adjusted to various locations to fit articles of a predetermined size. For example, inflatable member 100 may be adjusted to a first configuration 1122 in order to fit first article 1102. Likewise, inflatable member 100 may be adjusted to a second configuration 1124 to fit second article 1104. Furthermore, inflatable member 100 may be adjusted to a third configuration 1126 to fit third article 1106. It will be understood that in each case, inflatable member 100 may also be inflated to a different size corresponding to each different article size.

It will be understood that in different embodiments an inflatable member can be associated with varying ranges of shoe sizes. For example, in one embodiment, an inflatable member can be configured to accommodate any article with a size in the range between size 7 and size 8. In another embodiment, an inflatable member can be configured to accommodate any article with a size in the range between size 7 and size 9. In still another embodiment, an inflatable member can be configured to accommodate any article with a size in the range between size 5 and size 9. The ranges discussed here are only intended to be exemplary and in different embodiments an inflatable member can be used with articles of any standard or non-standard sizes.

In some cases, the material comprising an inflatable member can vary to accommodate different degrees of stretching. For example, in embodiments where an inflatable member may be used with a wide range of sizes, the inflatable member may be made of a substantially elastic material that is capable of expanding over several article sizes. However, in embodiments where an inflatable member may only be used with a narrow range of sizes, the inflatable member can be made of materials with a lower elasticity since the inflatable member may only undergo slight expansion.

Using a single inflatable member for articles of varying sizes can help reduce manufacturing costs over systems that require the use of a distinct last for each distinct article size. For example, an inflatable member can be used to provide support for manufacturing or otherwise modifying articles of varying different sizes. This allows a single inflatable member to be used to accommodate a range of footwear sizes. Furthermore, in embodiments where an inflatable member is capable of expanding through a larger range of sizes, the number of lasts required to operate a graphic transfer assembly can be further reduced.

It will be understood that in different embodiments, the positions of one or more adjustable portions could be varied using any known mechanisms. Although the current embodiments discuss using a linkage assembly to actuate the adjustable portions, in other embodiments any other mechanisms could be used.

Figure 12:
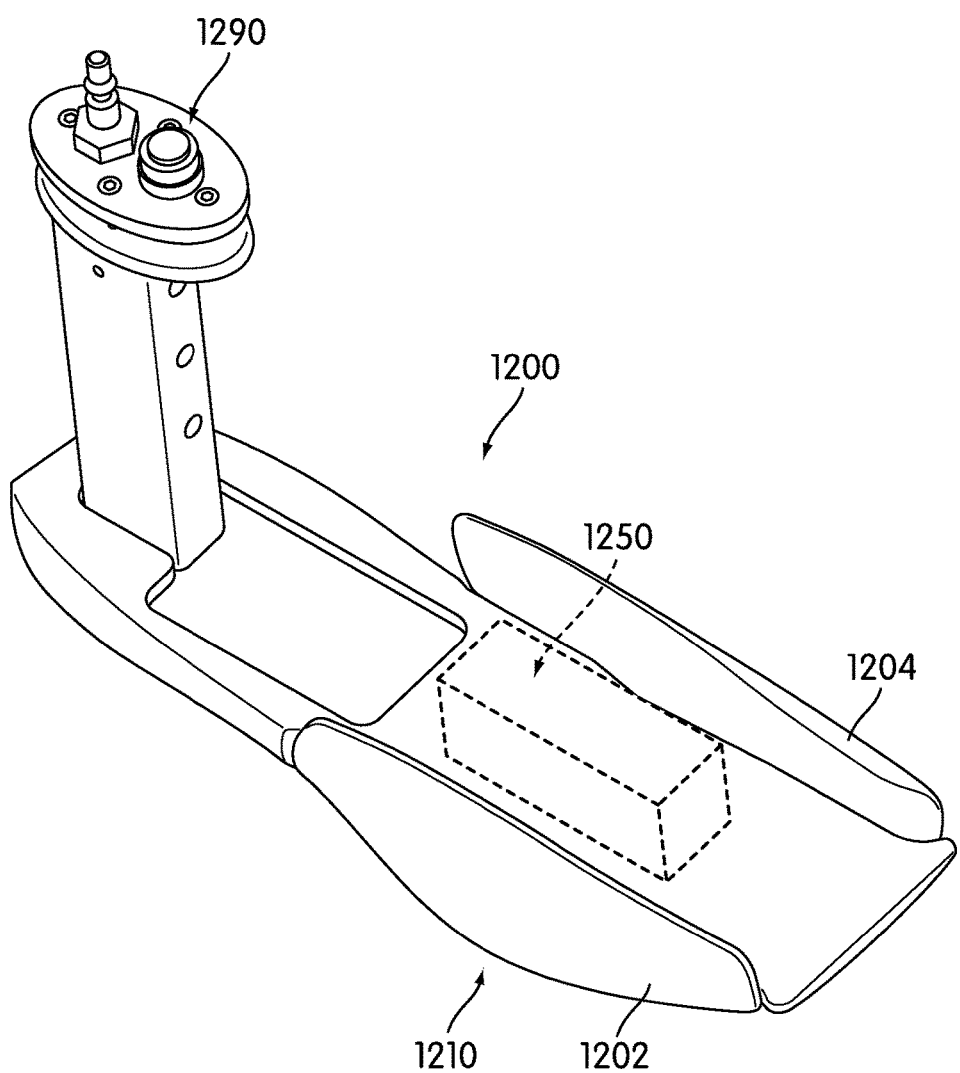
FIG. 12 is an isometric view of another embodiment of an inflatable member with an outer layer removed.
Figure 13:
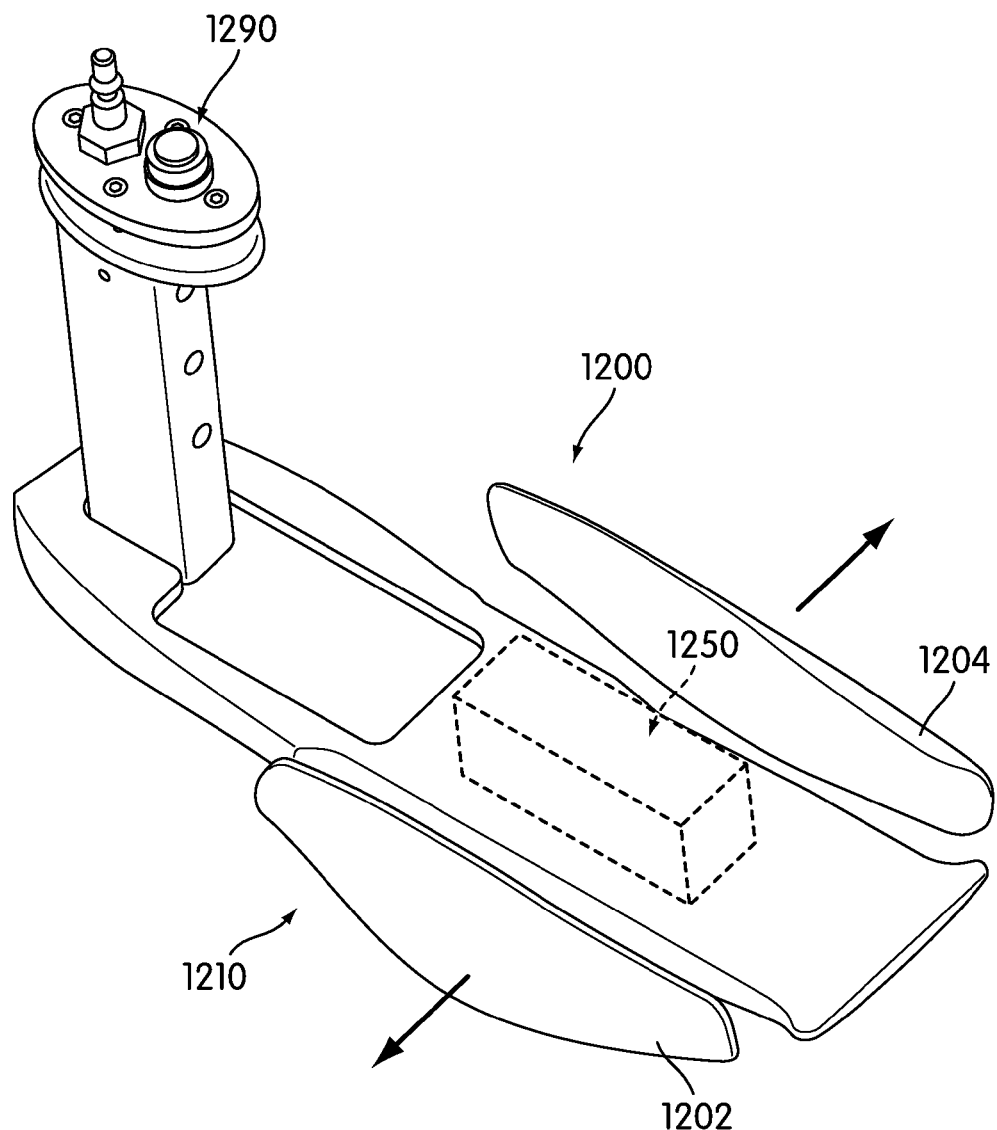
FIG. 13 is an isometric view of another embodiment of an inflatable member with an outer layer removed.

FIGS. 12 and 13 illustrate isometric views of the interior of another embodiment of inflatable member 1200. Inflatable member 1200 may be substantially similar to inflatable member 100 discussed above. For purposes of clarity, only some components of inflatable member 1200 are shown in the current embodiment. For example, in the current embodiment, inflatable member 1200 is shown without an outer layer.

Referring to FIGS. 12 and 13, inflatable member 1200 comprises first adjustable portion 1202 and second adjustable portion 1204. In this case, first adjustable portion 1202 and second adjustable portion 1204 are actuated using adjustment system 1250.

Generally, adjustment system 1250 could be any device or system for controlling the position of first adjustable portion 1202 and second adjustable portion 1204. In some embodiments, adjustment system 1250 could comprise a mechanical assembly. However, in other cases, adjustment system 1250 may not comprise a mechanical assembly. Moreover, in situations where adjustment system 1250 is a mechanical assembly, the mechanical assembly could vary from the assembly discussed in the previous embodiments. For example, adjustment system 1250 may or may not comprise linkages. Moreover, adjustment system 1250 may or may not be powered using an electrical motor. Examples of different kinds of actuating systems that could be used to adjust the positions of first adjustable portion 1202 and second adjustable portion 1204 include, but are not limited to: manual actuating systems, automatic actuating systems, mechanical actuating systems, electrical actuating systems, magnetic actuating systems, chemical actuating systems as well as any other kinds of actuating systems.

Referring to FIG. 12, first adjustable portion 1202 and second adjustable portion 1204 may be disposed in a retracted position. In this retracted position, the width of forefoot portion 1210 may be at a minimum value. Referring to FIG. 13, first adjustable portion 1202 and second adjustable portion 1204 are disposed in an extended position. The amount by which first adjustable portion 1202 and second adjustable portion 1204 are extended be selected according to the width of an article into which inflatable member 1200 may be inserted.

In some embodiments, inflatable member 1200 may include actuating button 1290. As discussed above, actuating button 1290 could be used to automatically change the positions of first adjustable portion 1202 and second adjustable portion 1204. In other embodiments, however, inflatable member 1200 may not include an actuating button.

It should be understood that adjustable portions could be associated with any of the forefoot, midfoot or heel portions of an inflatable member. In other words, in some cases, one or more adjustable portions could extend through the heel and/or midfoot portions of the inflatable member as well as the forefoot portion.

Figure 14:
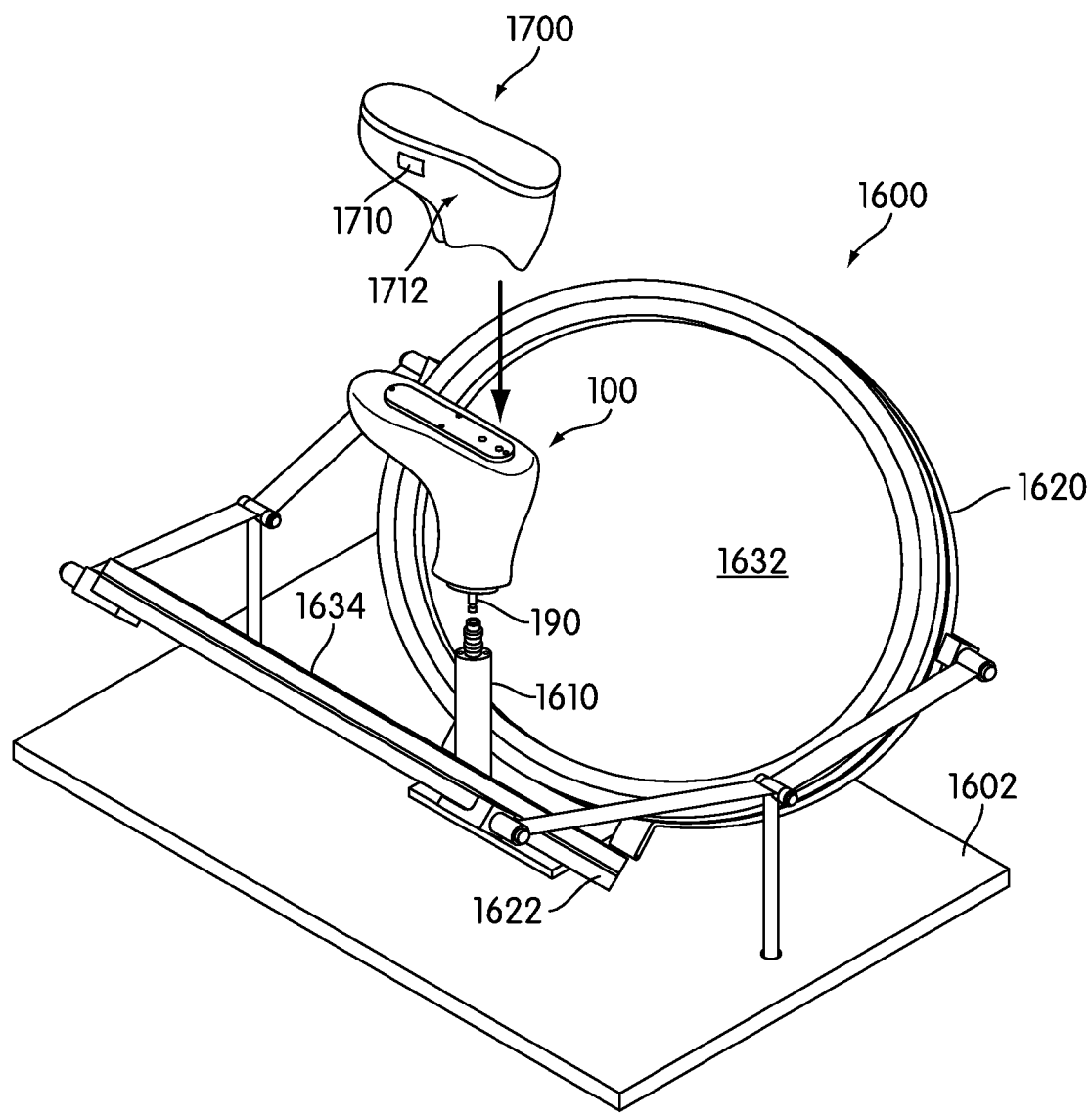
FIG. 14 is an isometric view of an embodiment of an inflatable member being used with a graphic transfer assembly.
Figure 15:
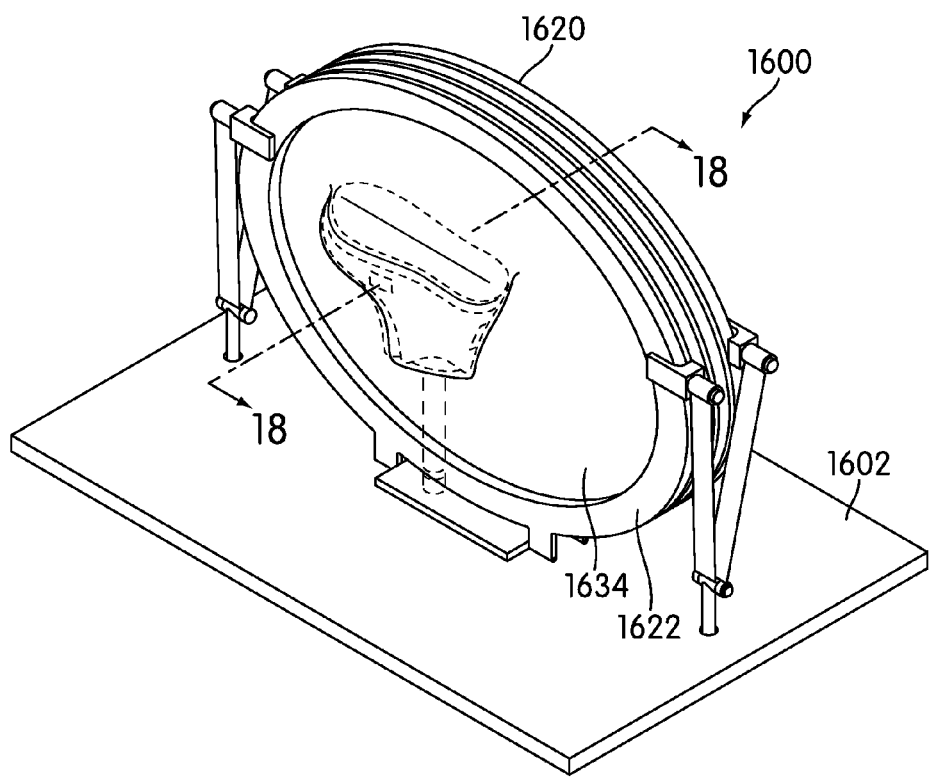
FIG. 15 is an isometric view of an embodiment of an inflatable member being used with a graphic transfer assembly.
Figure 16:
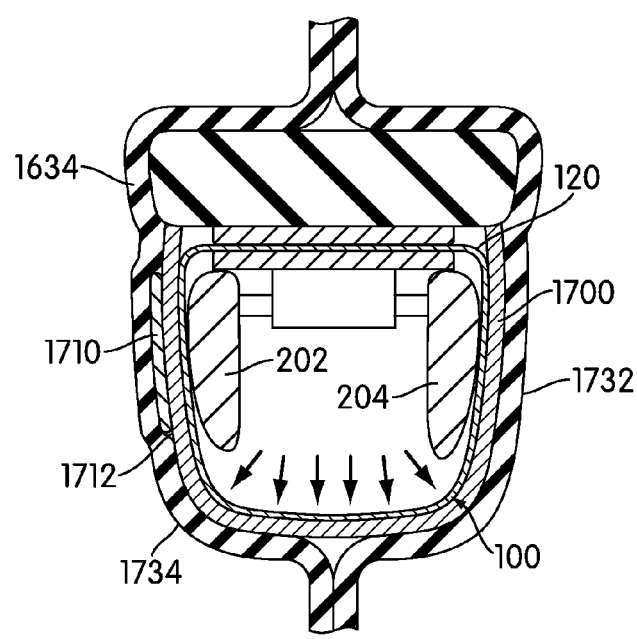
FIG. 16 is a cross-sectional view of an embodiment of an inflatable member used with a graphic transfer assembly.

FIG. 14 through 16 illustrate schematic views of a graphic transfer assembly 1600 that may be used with inflatable member 100. For purposes of clarity, only some components of graphic transfer assembly 1600 are described in detail in this embodiment. Examples of graphic transfer assemblies, including details regarding various different components, are described in detail in the Rapaport case. It will be understood that the current embodiment is only intended to illustrate one possible use for an inflatable member. As discussed throughout this detailed description, an inflatable member can be utilized for other purposes including footwear resizing and/or footwear manufacturing.

In some embodiments, graphic transfer assembly 1600 may be associated with base portion 1602. In some cases, graphic transfer assembly 1600 can further include first moveable portion 1620 and second moveable portion 1622. Also, first moveable portion 1620 and second moveable portion 1622 may be further associated with first deformable membrane 1632 and a second deformable membrane 1634. In addition, graphic transfer assembly 1600 may further include an actuation system that facilitates opening and closing of first moveable portion 1620 and second moveable portion 1622. Any type of actuation system can be used, including any of the systems discussed above.

In some embodiments, inflatable member 100 can include provisions for engaging with graphic transfer assembly 1600. In some embodiments, inflatable member 100 can include valve 190 for engaging with post 1610. In some cases, post 1610 can be configured to deliver fluid to valve 190 for purposes of inflating inflatable member 100. Also, in some cases, post 1610 can include provisions for applying a vacuum between first deformable membrane 1632 and second deformable membrane 1634. In particular, post 1610 could include various fluid lines or tubes connected to various pumps for inflation as well as vacuums. Examples of such an arrangement are discussed in detail in the Rapaport case.

Inflatable member 100 may be configured to receive article of footwear 1700, hereby referred to simply as article 1700. Article 1700 may be fit onto inflatable member 100 to fascilitate transferring graphic 1710 to side portion 1712 of article 1700. In some cases, side portion 1712 may be a curved side portion corresponding to a lateral side of a shoe. In some cases, inflatable member 100 may be configured to provide substantially consistent pressure along side portion 1712 while applying graphic 1710 to article 1700.

Referring to FIGS. 15 and 16, inflatable member 100 has been inserted into article 1700 and also connected to graphic transfer assembly 1600. Moreover, first deformable membrane 1632 and second deformable membrane 1634 have been closed around inflatable member 100 and article 1700. In addition, a vacuum has been applied so that first deformable membrane 1632 and second deformable membrane 1634 are pulled taut against the outer surface of article 1700.

Prior to this, the size of inflatable member 100 may be adjusted to fit article 1700 in the manner described above. In particular, one or more adjustable portions could be adjusted to fit the lateral and medial sides of article 1700. Also, inflatable member 100 could be inflated to a size that fits article 1700.

As seen in FIG. 16, first adjustable portion 202 and second adjustable portion 204 are adjusted to fit the width of article 1700 in the forefoot. Moreover, inflatable member 100 has been pressurized so that it fits the remainder of article 1700 as well. In this situation, first adjustable portion 202 provides shape and support to outer layer 120 in the area adjacent to side portion 1712 of article 1700. This helps to ensure that graphic 1710 may be effectively transferred to side portion 1712. In particular, it helps reinforce the desired shape for side portion 1712 and prevents side portion 1712 from collapsing under the pressure of second deformable membrane 1634.

An inflatable member can include provisions for adjusting the size of an article of footwear. For example, in some cases, an inflatable member can be used to adjust the width of an article of footwear after the article of footwear had been manufactured. In one embodiment, an inflatable member can be used with a footwear adjustment system.

Figure 17:
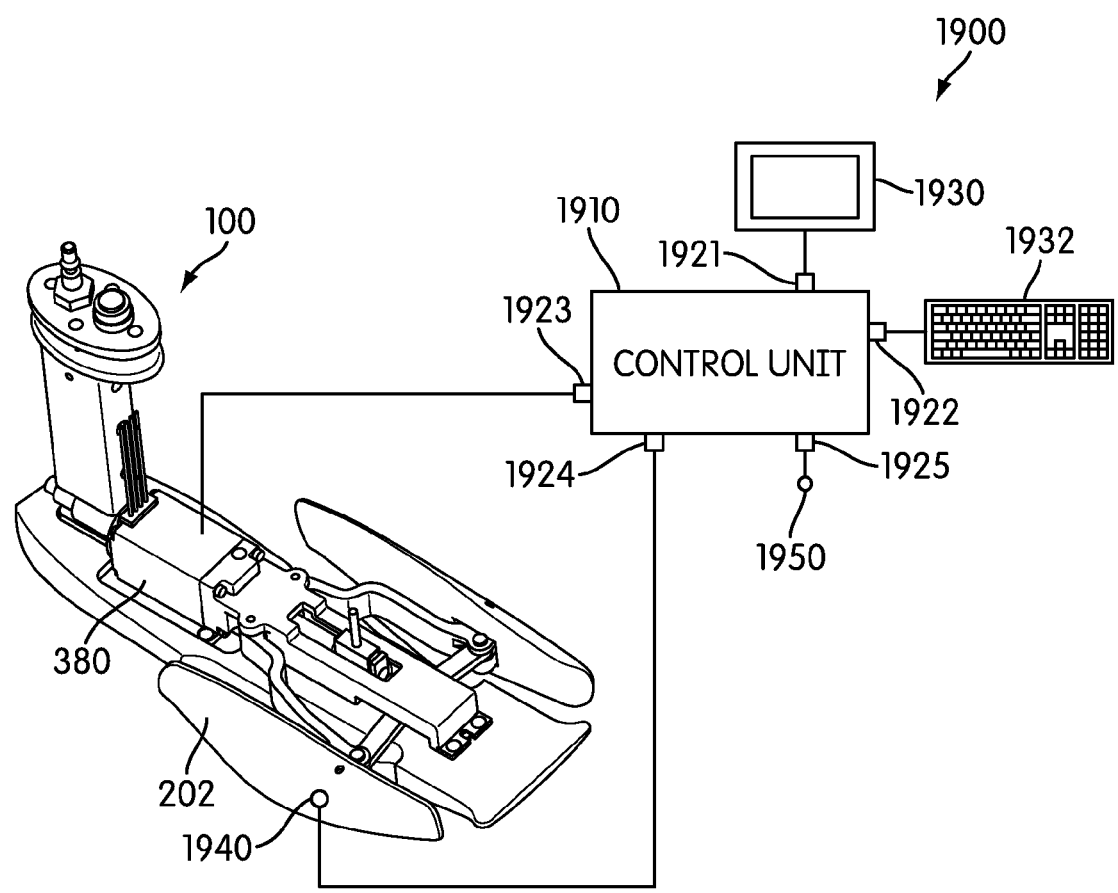
FIG. 17 illustrates a schematic view of an embodiment of an adjustment system.

FIG. 17 illustrates a schematic view of an embodiment of footwear adjustment system 1900. In some embodiments, adjustment system 1900 can be used to automatically adjust the size, including the width, of an article of footwear. For purposes of clarity, only some components of adjustment system 1900 are shown in this embodiment. In other embodiments, additional components could be used. In still other embodiments, some components shown here could be optional.

Referring to FIG. 17, adjustment system 1900 includes inflatable member 100. For purposes of illustration, inflatable member 100 is shown in isolation. In some embodiments, inflatable member 100 may be attached to a graphic transfer assembly, or any other components required to operate inflatable member 100. For example, in some embodiments, inflatable member 100 is configured to receive fluid of some kind. Moreover, in some cases, inflatable member 100 may be associated with one or more deformable membranes.

Adjustment system 1900 can include provisions for communicating, and in some cases controlling, the various components associated with inflatable member 100. In some embodiments, adjustment system 1900 may be associated with a computer or similar device. In the current embodiment, adjustment assembly 1900 may include a control unit 1910. In one embodiment, control unit 1910 may be configured to communicate with, and/or control, various components of adjustment assembly 1900. In addition, in some embodiments, control unit 1910 may be configured to control additional components that are not shown.

Control unit 1910 may include a microprocessor, RAM, ROM, and software all serving to monitor and supervise the operation of adjustment system 1900. Control unit 1910 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal.

Examples of these types of ports include soldering or electron traces on circuit boards.

All of the following ports and provisions associated with control unit 1910 are optional. Some embodiments may include a given port or provision, while others may exclude it. The following description discloses many of the possible ports and provisions that can be used. However, it should be kept in mind that not every part or provision must be used or included in a given embodiment.

In some embodiments, control unit 1910 can include port 1921 for communicating with display screen 1930. Likewise, control unit 1910 can include port 1922 for communicating with input device 1932. In some cases, display screen 1930 and input device 1932 could be the screen and keyboard of a computer or similar device.

Control unit 1910 can include port 1923 for communicating with motor assembly 380 of inflatable member 100. In some cases, control unit 1910 can deliver control signals to motor assembly 380. In other cases, control unit 1910 can receive signals from motor assembly 380. For example, in some cases, control unit 1910 can use signals received from motor assembly 380 to determine the angular position of a motor within motor assembly 380. This information could be used to approximate the position of one or more adjustable portions of inflatable member 100.

In some embodiments, control unit 1910 may include port 1924 for receiving information from sensor 1940. In some cases, sensor 1940 may be a force transducer. In other cases, sensor 1940 may be a pressure sensor of some kind. By detecting force and/or pressure information, control unit 1910 may be capable of determining when one or more components of inflatable member 100 are in contact with a portion of an article of footwear. For example, in some embodiments, sensor 1940 may be disposed on first adjustable portion 202. With this arrangement, sensor 1940 may be capable of detecting when the force applied to first adjustable portion 202 by an article of footwear is greater than a predetermined threshold. This allows control unit 1910 to determine when first adjustable portion 202 has extended to the full width of the article of footwear.

In some embodiments, control unit 1910 may include port 1925 for receiving information from sensor 1950. In some cases, sensor 1950 may be a position sensor. Moreover, sensor 1950 may be associated with any portion of inflatable member 100. By detecting the relative position between any portion of inflatable member 100 and an interior surface of an article of footwear, sensor 1950 can be used to detect a change in the relative position and therefore when inflatable member 100 is in contact with an article.

It will be understood that in other embodiments control unit 1910 may not be a separate component from inflatable member 100. For example, in some cases control unit 1910 could be integrated into inflatable member. In other cases, however, control unit 1910 may be associated with a computer that is in communication with inflatable member 100. For example, in some cases, a desktop or laptop at a retail store may function as the control unit of an adjustment system for controlling inflatable member 100 to adjust the width of an article of footwear.

Figure 18:
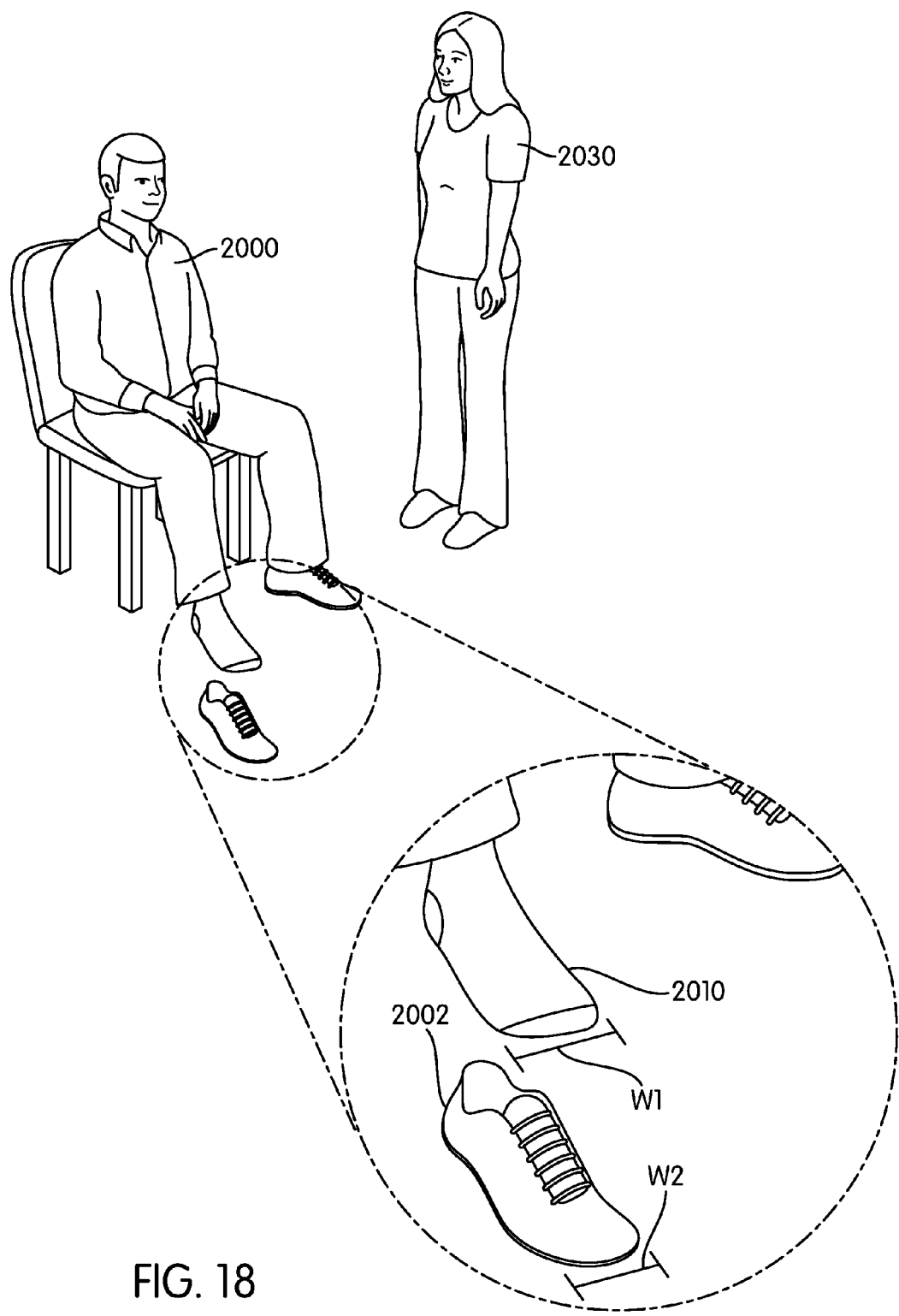
FIG. 18 illustrates an embodiment of a customer trying on footwear in a retail location.

FIG. 18 illustrates an embodiment of an interior of a retail location. Referring to FIG. 18, foot 2010 of customer 2000 is measured to have a width W1. However, customer 2000 wishes to purchase article of footwear 2002 that have width W2 that is smaller than width W1. Moreover, there are no similar articles of footwear having width W1. In order to accommodate customer 2000, proprietor 2030 may adjust the width of article of footwear 2002 using an adjustment system.

Figure 19:
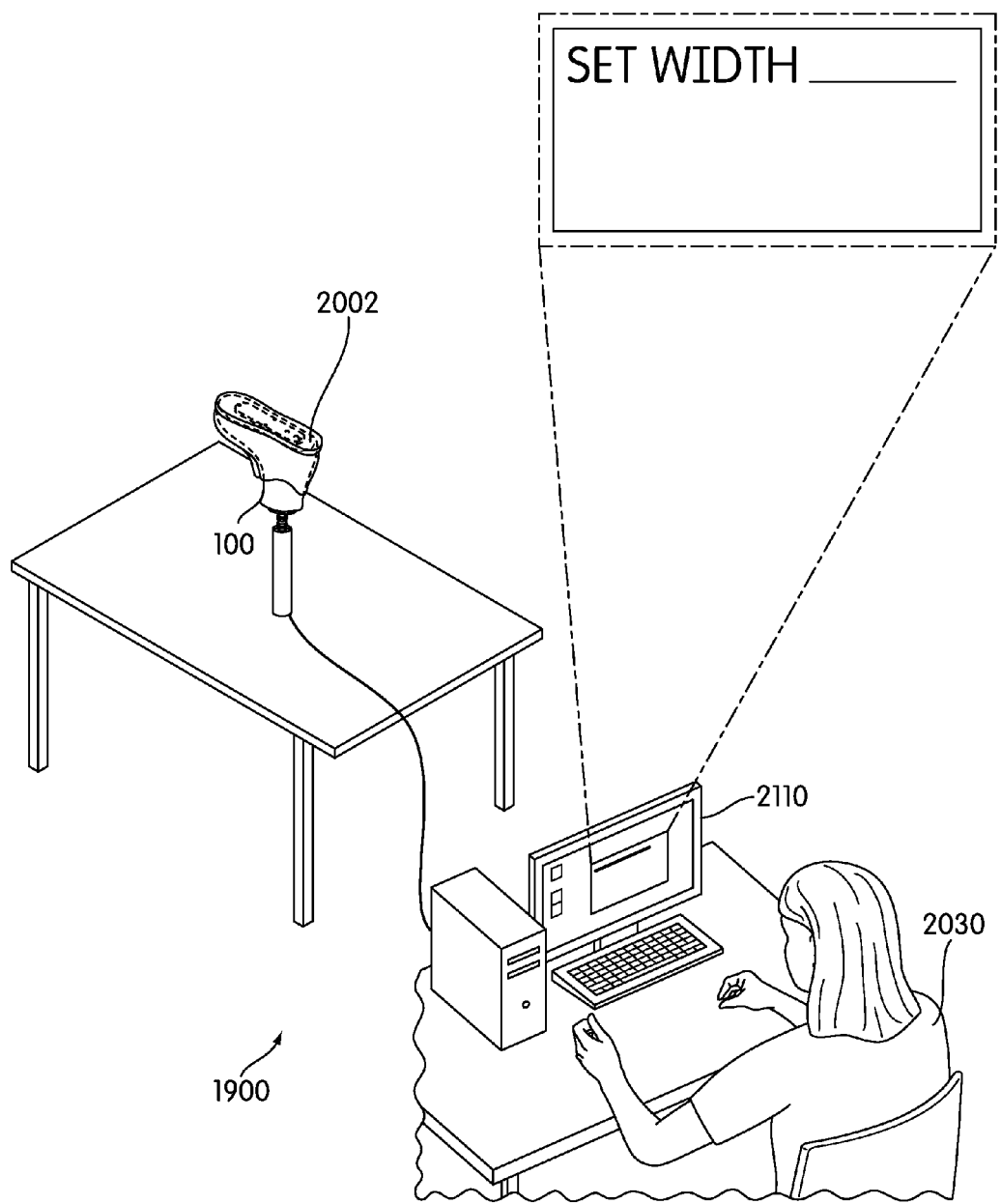
FIG. 19 illustrates an embodiment of a proprietor operating an adjustment system.

Referring now to FIG. 19, proprietor 2030 may use adjustment system 1900 to adjust the width of article 2002. Proprietor 2030 may place article 2002 on inflatable member 100. In some cases, inflatable member 100 could be mounted on a stand or post of some kind. In other cases, inflatable member 100 may be inserted into the footwear without being mounted to any device. In some cases, inflatable member 100 could be mounted to a post or device configured with one or more fluid lines that provide a fluid for filling inflatable member 100. In addition, proprietor may use computer 2110 to interface with adjustment system 1900. For example, in some cases, proprietor may enter the desired final width for article 2002 into computer 2110. In other cases, additional information can be input including the initial size, style, and/or material properties of article 2002.

Figure 20:
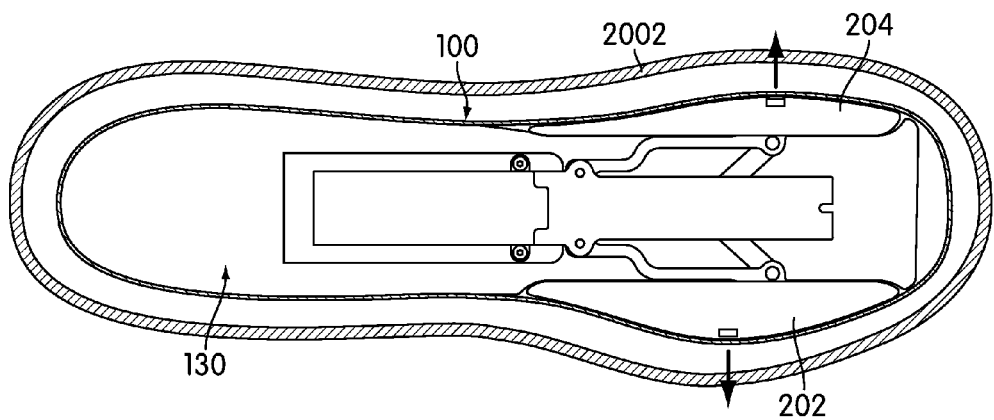
FIG. 20 illustrates a schematic cross sectional view of an embodiment of an inflatable last adjusting to the size of an article of footwear.
Figure 21:
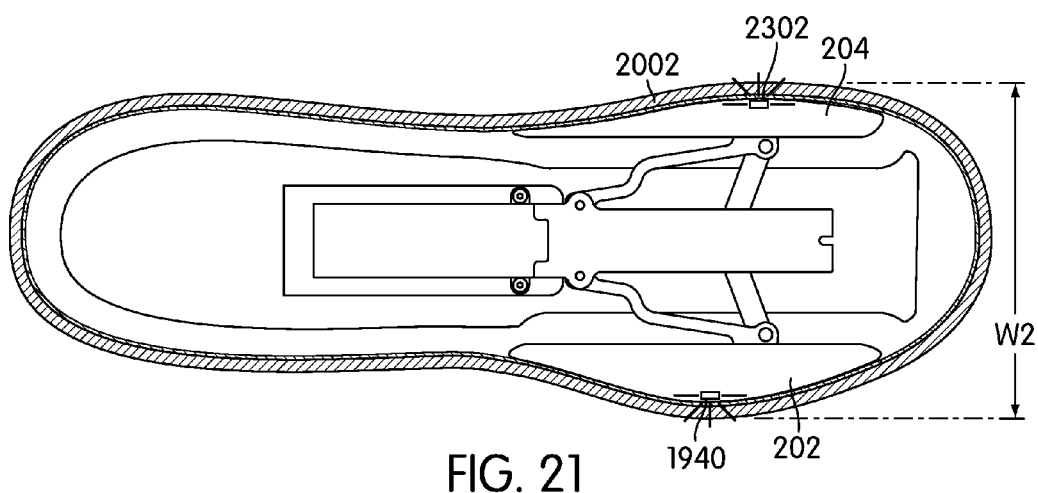
FIG. 21 illustrates a schematic cross sectional view of an embodiment of an inflatable last adjusting to the size of an article of footwear.

FIGS. 20 through 21 show schematic views of the process of increasing the width of article 2002. Initially, as seen in FIG. 20, inflatable member 100 is activated. At this point, first adjustable portion 202 and second adjustable portion 204 may begin moving outwardly, in a generally lateral direction. Also, interior chamber 130 may be filled with fluid so that inflatable member 100 fills the interior of article 2002.

As seen in FIG. 21, first adjustable portion 202 and second adjustable portion 204 may stop moving once adjustable system 100 detects that inflatable member 100 has contacted the interior surface of article 2002. In some cases, this can be determined using information from one or more force sensors. In other cases, this can be determined using motor position information. In still other cases, a position sensor associated with a portion of inflatable member 100 can be used to detect a change in position for determining when the inflatable member 100 is in contact with article 2002. In one embodiment, first pressure sensor 1940 and second pressure sensor 2302 may be used to determine when inflatable member 100 has increased to the width of article 2002. In this case first adjustable portion 202 and second adjustable portion 204 are stopped once inflatable member 100 has adjusted to the initial size of article 2002, including the initial width W2.

Figure 22:
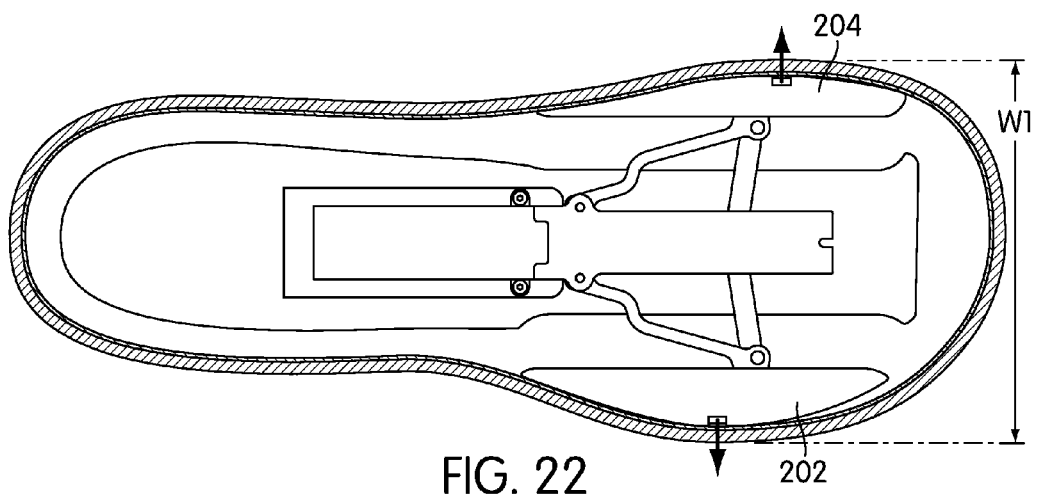
FIG. 22 illustrates a schematic cross sectional view of an embodiment of an inflatable last increasing the width of an article of footwear.

Once the initial width of article 2002 has been determined, adjustment system 1900 may control the movement of first adjustable portion 202 and second adjustable portion 204 to achieve the desired footwear width. As seen in FIG. 22, first adjustable portion 202 and second adjustable portion 204 may be extended beyond the initial width to achieve an adjusted width W1 for article 2002. This adjusted width may correspond to the desired width of the article for fitting the customer's foot.

Figure 23:
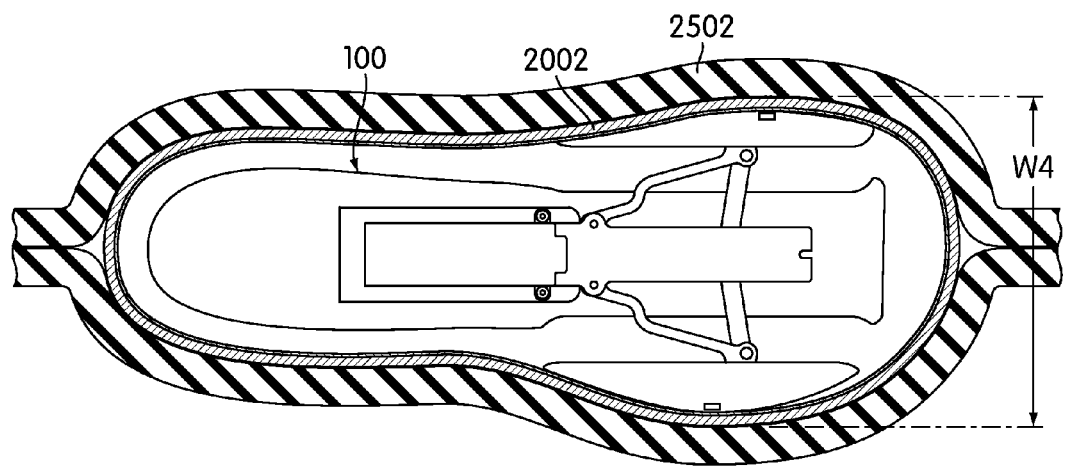
FIG. 23 illustrates a schematic cross sectional view of an embodiment of an inflatable last increasing the width of an article of footwear while heat and pressure are applied.
Figure 24:
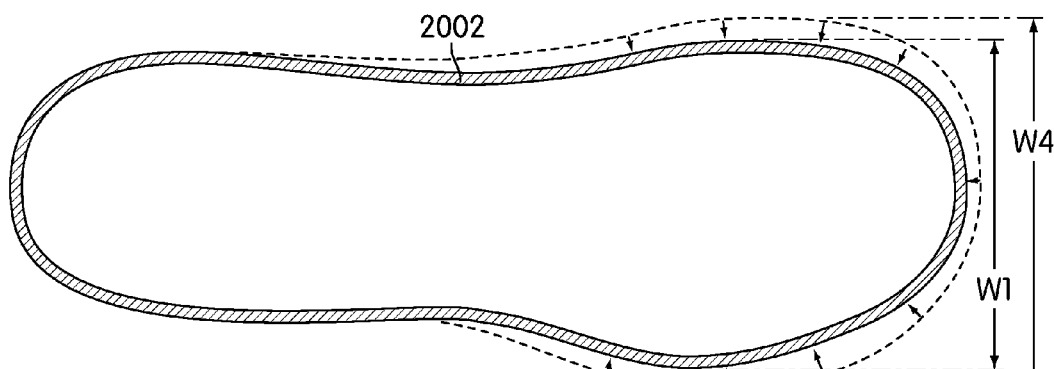
FIG. 24 illustrates a schematic cross sectional view of an embodiment of an article of footwear after an inflatable last has been removed.

In some embodiments, an adjustment system can adjust the width of the article beyond the desired width in order to accommodate "rebound" or "spring-back" of the material. For example, referring to FIGS. 23 and 24, inflatable member 100 may be used to adjust the width of article 2002 to a width W4, which is greater than a desired customer width W1. Furthermore, article 2002 may be kept in this stretched state for a predetermined period of time. In some cases, heat and/or pressure could be applied using one or more deformable membranes 2502. In other cases, pressure and/or heat could be applied in any other manner. As seen in FIG. 24, after removing inflatable member 100, article 2002 may contract slightly due to "rebound". In this case, article 2002 contracts from width W4 to the desired customer width W1.

Generally, an adjustment system may use any algorithm or process for determining the final adjusted width of the inflatable member so that the final width of the article of footwear is the desired customer width. In some cases, an adjustment system could use information about the material composition of the article of footwear as a factor in calculating how much the width should be adjusted to accommodate spring-back of the material. In other cases, any other information can be input into an adjustment system for calculating the width of the inflatable member to achieve the desired customer width.

With this arrangement, inflatable member 100 can be used to adjust the width of an article of footwear (or pair of footwear) after the article of footwear has been manufactured. As discussed here, this could be accomplished in any location, including a retail location. This allows a customer to purchase an article of footwear of a desired width in situations where the retail location doesn't have articles of footwear with the desired width in stock.

An inflatable member could be used to custom fit an article according to fitting preferences of a user or customer. For example, an inflatable member could be used to determine the approximate fit of an article of footwear already worn by a user, which corresponds to a good fit for the user. In some cases, for example, after wearing an article for a substantial period of time, the article becomes broken in, and adapts to the specific shape of a foot of a user. The inflatable member can then be used to customize the fit of another article of footwear in order to achieve a substantially similar fit for the user.

Figure 25:
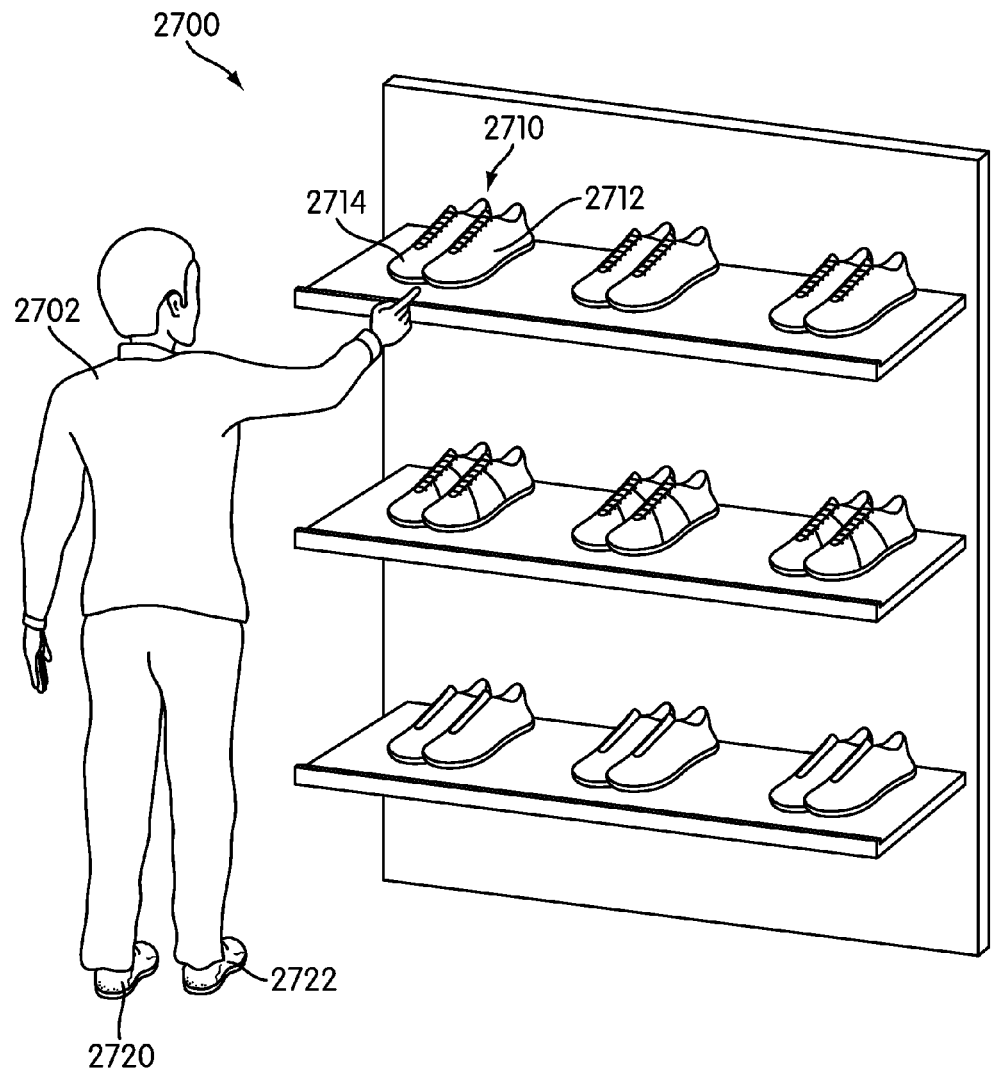
FIG. 25 illustrates a schematic view of a user selecting an embodiment of a pair of footwear.
Figure 26:
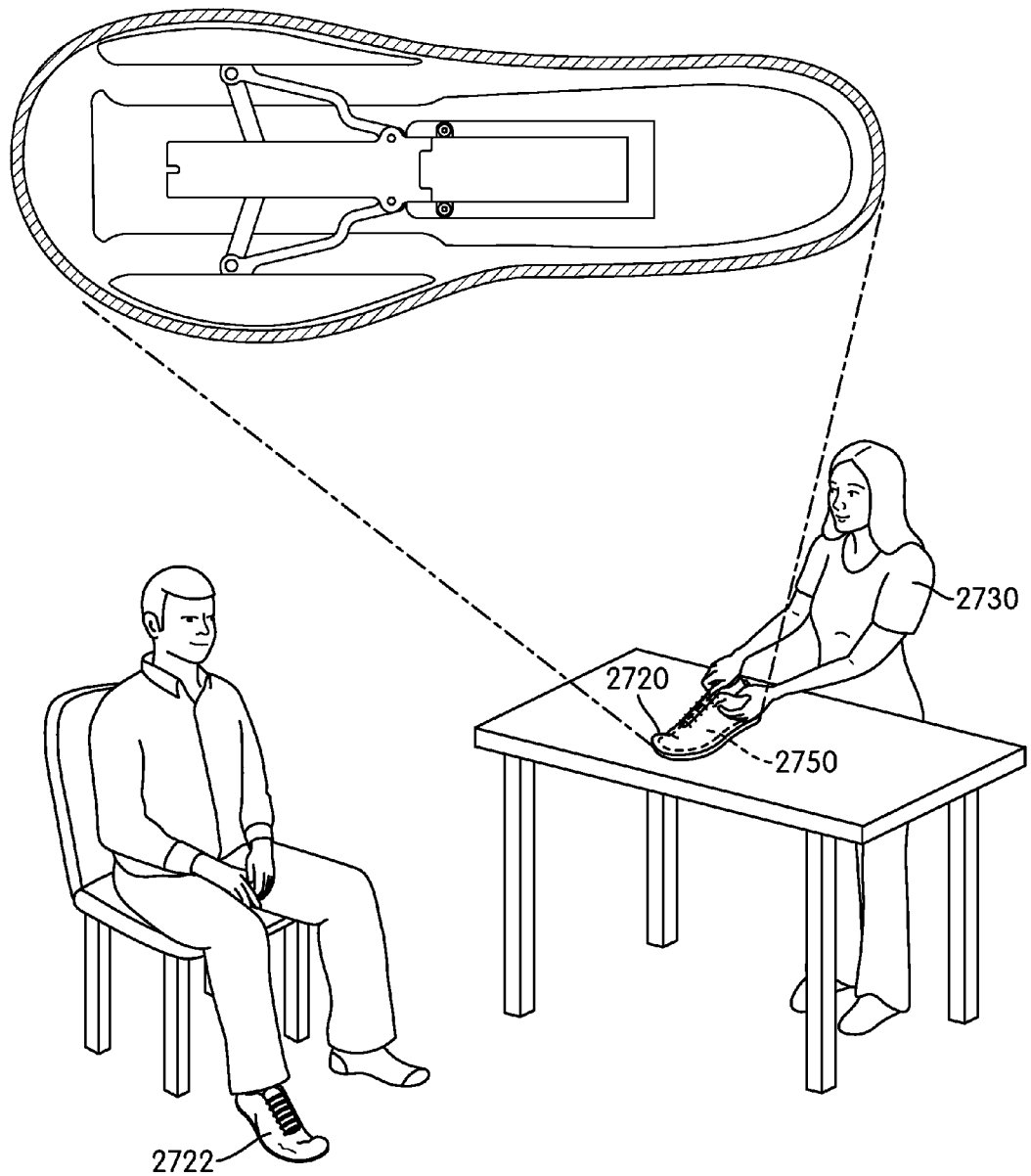
FIG. 26 illustrates a schematic view of an embodiment of a retailer using an inflatable member to determine the fit of a used article of footwear.
Figure 27:
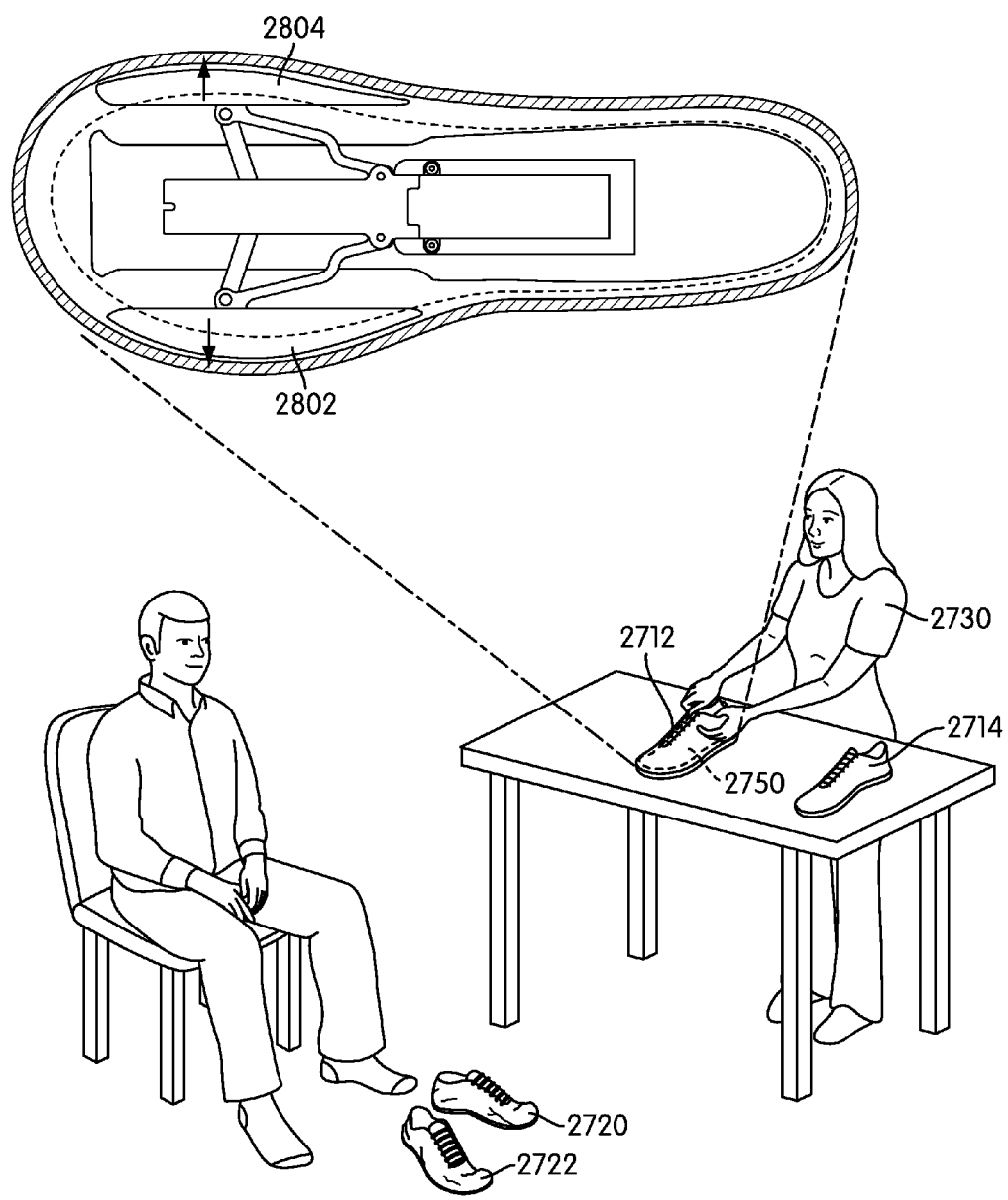
FIG. 27 illustrates a schematic view of an embodiment of a retailer using an inflatable member to create a customized fit for a new article of footwear.

FIGS. 25 through 27 illustrate an embodiment of a method of customizing the fit of an article of footwear. Referring first to FIG. 25, user 2702 may come to retail facility 2700 in order to purchase pair of footwear 2710, which comprises first article 2712 and second article 2714. In this case, user 2702 may already be wearing first article of footwear 2720 and second article 2722. In some cases, first article 2720 and second article 2722 may be broken in so that they provide a comfortable fit for the user.

As seen in FIG. 26, in order to achieve a user customized fit for first article 2712 and second article 2714, retailer 2730 may use inflatable member 2750. For example, inflatable member 2750 may be inserted into first article 2720. The size and/or shape of inflatable member 2750 may be adjusted until the inflatable member 2750 has adapted to the fit of first article 2720. In some cases, this process of fitting inflatable member 2750 may be achieved automatically by using sensors including any of the types of sensors discussed above. In other cases, the process of fitting inflatable member 2750 may be achieved manually.

During this step, inflatable member 2750 can be used to determine the customized fit of article 2720. In some cases, the customized fit can include a width. In other cases, the customized fit can include additional fitting information as well. Moreover, in some cases, the customized fit information, including the width, can be stored in a database, such as an online database that may be accessed by a user and which stores various kinds of user profile information including footwear sizing, apparel sizing and/or other preferences.

Following this, as shown in FIG. 27, inflatable member 2750 may be inserted into first article 2712. In some cases, the size of inflatable member 2750 may be decreased before insertion into first article 2712. This decrease in size could be achieved by deflating inflatable member 2750 and also by contracting first adjustable portion 2802 and second adjustable portion 2804. Once inflatable member 2750 has been inserted into first article 2712, inflatable member 2750 may be adjusted to achieve the shape and size associated with the fit of first article 2120. For example, first adjustable portion 2802 and second adjustable portion 2804 could be extended to preconfigured width so that first article 2712 has a substantially similar width to first article 2720.

It will be understood that a substantially similar process could be used to provide a user customized fit for second article 2714. In particular, inflatable member 2750 may be used to measure the approximate fit of second article 2722. This fitting information could then be used to reshape second article 2714 so that second article 2714 has a substantially similar fit to second article 2722.

While various embodiments have been described, the description is intended to be exemplary, rather than limiting and it will be apparent to those of ordinary skill in the art that many more embodiments and implementations are possible that are within the scope of the embodiment. Accordingly, the embodiments are not to be restricted except in light of the attached claims and their equivalents. Also, various modifications and changes may be made within the scope of the attached claims.

What is claimed is:

1. A method of applying a graphic to an article, comprising:
    filling an inflatable member with fluid;
    changing a position of an adjustable portion disposed inside the inflatable member, the position being selected according to a size of the article;
    associating the article with the inflatable member;
    associating the graphic with a surface of the article;
    pressing a deformable membrane against a portion of the article so that the deformable membrane conforms to the surface;
    heating the deformable membrane; and
    thereby transferring the graphic to the surface of the article.

2. The method according to claim 1, wherein the graphic is applied to a portion of the article that corresponds to a location of the adjustable portion of the inflatable member.

3. The method according to claim 1, wherein the adjustable portion is substantially rigid.

4. The method according to claim 1, wherein the position of the adjustable portion is controlled using an electrically actuated adjustment assembly.

5. The method according to claim 1, wherein the position of the adjustable portion is manually adjusted.

6. The method according to claim 1, wherein a geometry of the adjustable portion is associated with a shape of a portion of a last.

7. The method according to claim 1, wherein the inflatable member includes an outer layer that can expand and the adjustable portion is disposed inside the outer layer.

8. The method according to claim 7, wherein the inflatable member further includes:
    an interior chamber disposed within the outer layer; and
    a fluid port providing fluid communication between the interior chamber and an external source of fluid, wherein the fluid port may be used to inflate the interior chamber.

9. The method according to claim 8, wherein the adjustable portion is more rigid than the outer layer.

10. The method according to claim 1, wherein the step of changing the position of the adjustable portion includes a step of receiving information from at least one sensor.

11. The method according to claim 10, wherein the sensor is a force sensor.

12. The method according to claim 10, wherein the sensor is a position sensor.

13. The method according to claim 1, wherein the step of heating the deformable membrane is performed while the inflatable member is inserted inside the article.

14. The method according to claim 1, wherein the method includes a step of applying pressure to the article while the inflatable member is inserted inside the article.

15. The method according to claim 14, wherein the inflatable member provides support to at least one side portion of the article to prevent collapsing during the step of applying pressure to the article.

16. The method according to claim 1, wherein the portion of the article that the deformable membrane is pressing against is at least one of a medial side and a lateral side of the article.

17. The method according to claim 16, wherein the adjustable portion of the inflatable member is configured to provide support to the at least one of the medial side and the lateral side of the article.

* * * * *

UNITED STATES PATENT AND TRADEMARK OFFICE
CERTIFICATE OF CORRECTION

PATENT NO. : 9,788,611 B2  
APPLICATION NO. : 15/008605  
DATED : October 17, 2017  
INVENTOR(S) : Langvin et al.

Page 1 of 1

It is certified that error appears in the above-identified patent and that said Letters Patent is hereby corrected as shown below:

On the Title Page

Page 3, Column 2, item (56) Other Publications, Line 4:
After "2002.", insert --¶International Search Report and Written Opinion for Application No. PCT/US2009/059018, mailed Apr. 20, 2010.
International Search Report and Written Opinion for Application No. PCT/US2010/039306, mailed on Oct. 4, 2011, 8 pgs.
International Search Report and Written Opinion for Application No. PCT/US2012/034734, mailed Oct. 30, 2012.
Partial International Search Report for Application No. PCT/US2009/059018, mailed Jan. 28, 2010.--

Signed and Sealed this  
Fifteenth Day of August, 2023

Katherine Kelly Vidal  
*Director of the United States Patent and Trademark Office*